(12) United States Patent
Hildreth et al.

(10) Patent No.: US 8,625,849 B2
(45) Date of Patent: *Jan. 7, 2014

(54) MULTIPLE CAMERA CONTROL SYSTEM

(75) Inventors: Evan Hildreth, Ottawa (CA); Francis Macdougall, Ottawa (CA)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/364,077

(22) Filed: Feb. 1, 2012

(65) Prior Publication Data

US 2012/0206337 A1     Aug. 16, 2012

Related U.S. Application Data

(63) Continuation of application No. 12/493,958, filed on Jun. 29, 2009, now Pat. No. 8,131,015, which is a continuation of application No. 11/932,869, filed on Oct. 31, 2007, now Pat. No. 7,555,142, which is a continuation of application No. 11/304,000, filed on Dec. 19, 2005, now Pat. No. 7,421,093, which is a continuation of application No. 09/962,612, filed on Sep. 26, 2001, now Pat. No. 7,058,204.

(60) Provisional application No. 60/237,187, filed on Oct. 3, 2000.

(51) Int. Cl.
  *G06K 9/00*   (2006.01)
  *G06K 9/36*   (2006.01)

(52) U.S. Cl.
  USPC .......................................... 382/103; 382/154

(58) Field of Classification Search
  USPC ......... 382/103, 106, 107, 154, 286, 291, 292;
                348/42, 47, 48, 143, 153, 159; 345/863
  See application file for complete search history.

(56) References Cited

U.S. PATENT DOCUMENTS

| 4,144,449 A | 3/1979 | Funk et al. |
| 4,247,767 A | 1/1981 | OBrien et al. |

(Continued)

FOREIGN PATENT DOCUMENTS

| DE | 19810452 A1 | 12/1998 |
| EP | 0905644 A2  | 3/1999 |

(Continued)

OTHER PUBLICATIONS

Bud K. Funk," CCDs in Optical Touch Panels Deliver High Resolution", Electronic Design, Sep. 1980.

(Continued)

*Primary Examiner* — Yon Couso
(74) *Attorney, Agent, or Firm* — Kilpatrick Townsend & Stockton LLP

(57) ABSTRACT

A multiple camera tracking system for interfacing with an application program is provided. The tracking system includes multiple cameras arranged to provide different viewpoints of a region of interest, and are operable to produce a series of video images. A processor is operable to receive the series of video images and detect objects appearing in the region of interest. The processor executes a process to generate a background data set from the video images, generate an image data set for each received video image, compare each image data set to the background data set to produce a difference map for each image data set, detect a relative position of an object of interest within each difference map, and produce an absolute position of the object of interest from the relative positions of the object of interest and map the absolute position to a position indicator associated with the application program.

24 Claims, 16 Drawing Sheets

(56) References Cited

U.S. PATENT DOCUMENTS

| | | |
|---|---|---|
| 4,507,557 A | 3/1985 | Tsikos |
| 4,742,221 A | 5/1988 | Sasaki et al. |
| 4,746,770 A | 5/1988 | McAvinney |
| 4,782,328 A | 11/1988 | Denlinger |
| 4,818,826 A | 4/1989 | Kimura |
| 5,097,516 A | 3/1992 | Amir |
| 5,109,435 A | 4/1992 | Lo et al. |
| 5,317,140 A | 5/1994 | Dunthorn |
| 5,483,603 A | 1/1996 | Luke et al. |
| 5,502,568 A | 3/1996 | Ogawa et al. |
| 5,534,917 A | 7/1996 | MacDougall |
| 5,581,276 A | 12/1996 | Cipolla et al. |
| 5,638,092 A | 6/1997 | Eng et al. |
| 5,769,640 A | 6/1998 | Jacobus et al. |
| 5,844,392 A | 12/1998 | Peurach et al. |
| 5,907,328 A | 5/1999 | Brush, II et al. |
| 5,911,004 A | 6/1999 | Ohuchi et al. |
| 5,936,615 A | 8/1999 | Waters |
| 6,002,808 A | 12/1999 | Freeman |
| 6,008,798 A | 12/1999 | Mato, Jr. et al. |
| 6,072,494 A | 6/2000 | Nguyen |
| 6,075,895 A | 6/2000 | Qiao et al. |
| 6,100,538 A | 8/2000 | Ogawa |
| 6,173,066 B1 | 1/2001 | Peurach et al. |
| 6,191,773 B1 | 2/2001 | Maruno et al. |
| 6,208,330 B1 | 3/2001 | Hasegawa et al. |
| 6,215,890 B1 | 4/2001 | Matsuo et al. |
| 6,222,465 B1 | 4/2001 | Kumar et al. |
| 6,256,033 B1 | 7/2001 | Nguyen |
| 6,256,400 B1 | 7/2001 | Takata et al. |
| 6,335,724 B1 | 1/2002 | Takekawa et al. |
| 6,414,671 B1 | 7/2002 | Gillespie et al. |
| 6,421,042 B1 | 7/2002 | Omura et al. |
| 6,421,048 B1 | 7/2002 | Shih et al. |
| 6,429,856 B1 | 8/2002 | Omura et al. |
| 6,531,999 B1 | 3/2003 | Trajkovic |
| 6,563,491 B1 | 5/2003 | Omura |
| 6,594,023 B1 | 7/2003 | Omura et al. |
| 6,614,422 B1 | 9/2003 | Rafii et al. |
| 6,993,179 B1 | 1/2006 | Weinshall et al. |
| 2001/0019325 A1 | 9/2001 | Takekawa |
| 2001/0020933 A1 | 9/2001 | Maggioni |
| 2001/0022579 A1 | 9/2001 | Hirabayashi |
| 2001/0026268 A1 | 10/2001 | Ito |
| 2002/0015024 A1 | 2/2002 | Westerman et al. |
| 2002/0015064 A1 | 2/2002 | Robotham et al. |
| 2003/0112228 A1 | 6/2003 | Gillespie et al. |
| 2004/0012573 A1 | 1/2004 | Morrison et al. |

FOREIGN PATENT DOCUMENTS

| | | |
|---|---|---|
| JP | 57211637 A | 12/1982 |
| JP | 8240407 A | 9/1996 |
| JP | 9091094 A | 4/1997 |
| JP | 9319501 A | 12/1997 |
| WO | WO9935633 A2 | 7/1999 |
| WO | WO9940562 A1 | 8/1999 |

OTHER PUBLICATIONS

Christopher eveland et al., "Background Modeling for Segmentation of Video-Rate Stereo Sequences", Computer Science Department, University of Rochester, Rochester, NY, 1998, pp. 266-271, XP002229566.

International Search Report—PCT/US2001/030840—ISA/EPO—Feb. 24, 2003.

Jennings, C. "Robust Finger Tracking with Multiple Cameras", Proceedings, International Workshop on Recognition, Analysis, and Tracking of Faces and Gestures in Real-Time Systems, Jul. 20, 1999, (http://www.cs.ubc.ca/spider/jennings/ratfg-rts99/cj99.html).

Morrison, et al,. "Machine Vision Passive Touch Technology for Interactive Displays," SID 01 Digest, Jun. 2001, pp. 74-77.

Nebojsa Jojie et al .,"Detection and Estimation of Pointing Gestures in Dense Disparity Maps", Fourth IEEE International Conference on Automatic Face and Gesture Recognition, Mar. 28-30, 2000, ECE Dept. & Beckman Institute; University of Illinois, Urbana, pp. 468-475, XP10378301.

Okutomi, et al., "A Multiple-baseline Stereo," IEEE Transactions of Pattern Analysis and machine Intelligence, vol. 14, No. 4, Apr. 1993, pp. 355-363.

Scharstein D. et al., "Stereo Matching with Non-Linear Diffusion" which was published in Proceedings of the 1996 Conference on Computer Vision and Pattern Recognition (CVPR '96) middlebury.edu/.about.schar/papers/diffusion.ps.gz, 1996.

Toyama et al., "Wallflower: Principles and Practice of Background Maintenance", The Proceedings of the Seventh IEEE International Conference on Kerkyra, Computer Vision 1999, vol. 1, pp. 255-261. XP-002229565.

Urmson, "A Comparison of Pt. Grey Research's Digiclops and Videre Design's Small Vision System for Sensing on the Hypeion Robot," (http://www.videredesign.com), Nov. 2000.

Zhang, "A Flexible New Technique for Camera Calibration", IEEE Transactions on Pattern Analysis and Machine Intelligence, vol. 22, No. 11, pp. 1330-1334, 1998.

Zhang, "Determining the Epipolar Geometry and its Uncertainty", International Journal of Computer Vision, vol. 27, No. 2, pp. 161-198, 1998.

Small Vision Systems Stereo Developer Kit, http://www.videredesign.com., Oct. 19, 2011, 4 pages.

Raw Image

Filtered Image

Low-Value Threshold
Fug. 5C

High-Value Threshold

Binary Difference

Binary Difference Map

Reduced Difference Map

Another Binary Difference Map

MULTIPLE CAMERA CONTROL SYSTEM

CROSS REFERENCE TO RELATED APPLICATIONS

"This application is a continuation of U.S. application Ser. No. 12/493,958, filed Jun. 29, 2009, entitled "MULTIPLE CAMERA CONTROL SYSTEM," which is a continuation of U.S. application Ser. No. 11/932,869, filed Oct. 31, 2007, entitled "MULTIPLE CAMERA CONTROL SYSTEM," now U.S. Pat. No. 7,555,142, which is a continuation of U.S. application Ser. No. 11/304,000, filed Dec. 19, 2005, entitled "MULTIPLE CAMERA CONTROL SYSTEM," now U.S. Pat. No. 7,421,093, which is a continuation of U.S. application Ser. No. 09/962,612, filed Sep. 26, 2001, entitled "MULTIPLE CAMERA CONTROL SYSTEM," now U.S. Pat. No. 7,058,204, which claims the benefit of U.S. Provisional Application No. 60/237,187, filed Oct. 3, 2000, entitled "DUAL CAMERA CONTROL SYSTEM." All of these applications are incorporated by reference in their entirety."

TECHNICAL FIELD

This invention relates to an object tracking system, and more particularly to a video camera based object tracking and interface control system.

BACKGROUND

A variety of operating systems are currently available for interacting with and controlling a computer system. Many of these operating systems use standardized interface functions based on commonly accepted graphical user interface (GUI) functions and control techniques. As a result, different computer platforms and user applications can be easily controlled by a user who is relatively unfamiliar with the platform and/or application, as the functions and control techniques are generally common from one GUI to another.

One commonly accepted control technique is the use of a mouse or trackball style pointing device to move a cursor over screen objects. An action, such as clicking (single or double) on the object, executes a GUI function. However, for someone who is unfamiliar with operating a computer mouse, selecting GUI functions may present a challenge that prevents them from interfacing with the computer system. There also exist situations where it becomes impractical to provide access to a computer mouse or trackball, such as in front of a department store display window on a city street, or while standing in front of a large presentation screen to lecture before a group of people.

SUMMARY

In one general aspect, a method of tracking an object of interest is disclosed. The method includes acquiring a first image and a second image representing different viewpoints of the object of interest, and processing the first image into a first image data set and the second image into a second image data set. The method further includes processing the first image data set and the second image data set to generate a background data set associated with a background, and generating a first difference map by determining differences between the first image data set and the background data set, and a second difference map by determining differences between the second image data set and the background data set. The method also includes detecting a first relative position of the object of interest in the first difference map and a second relative position of the object of interest in the second difference map, and producing an absolute position of the object of interest from the first and second relative positions of the object of interest.

The step of processing the first image into the first image data set and the second image into the second image data set may include determining an active image region for each of the first and second images, and extracting an active image data set from the first and second images contained within the active image region. The step of extracting the active image data set may include one or more techniques of cropping the first and second images, rotating the first and second images, or shearing the first and second images.

In one implementation, the step of extracting the active image data set may include arranging the active image data set into an image pixel array having rows and columns. The step of extracting further may include identifying the maximum pixel value within each column of the image pixel array, and generating data sets having one row wherein the identified maximum pixel value for each column represents that column.

Processing the first image into a first image data set and the second image into a second image data set also may include filtering the first and second images. Filtering may include extracting the edges in the first and second images. Filtering further may include processing the first image data set and the second image data set to emphasize differences between the first image data set and the background data set, and to emphasize differences between the second image data set and the background data set.

Processing the first image data set and the second image data set to generate the background data set may include generating a first set of one or more background data sets associated with the first image data set, and generating a second set of one or more background data sets associated with the second image data set.

Generating the first set of one or more background data sets may include generating a first background set representing a maximum value of data within the first image data set representative of the background, and generating the second set of one or more background data sets includes generating a second background set representing a maximum value of data within the second image data set representative of the background. Generating further may include, for the first and second background sets representing the maximum value of data representative of the background, increasing the values contained within the first and second background sets by a predetermined value.

Generating the first set of one or more background data sets may include generating a first background set representing a minimum value of data within the first image data set representative of the background, and generating the second set of one or more background data sets may include generating a second background set representing a minimum value of data within the second image data set representative of the background. Generating further may include, for the first and second background sets representing the minimum value of data representative of the background, decreasing the values contained within the first and second background sets by a predetermined value.

Generating the first set of background data sets may include sampling the first image data set, and generating the second set of background data sets may include sampling the second image data set. Sampling may occur automatically at predefined time intervals, where each sample may include data that is not associated with the background.

Generating the first set of one or more background data sets may include maintaining multiple samples of the first image data set within each background data set, and generating the second set of one or more background data sets may include maintaining multiple samples of the second image data set within each background data set.

Generating each first background data set may include selecting from the multiple samples one value that is representative of the background for each element within the first image data set, and generating each second background data set may include selecting from the multiple samples one value that is representative of the background for each element within the second image data set. Selecting may include selecting the median value from all sample values in each of the background data sets.

In other implementations, generating may include comparing the first image data set to a subset of the background data set, and comparing the second image data set to a subset of the background data set.

In other implementations generating a first difference map further may include representing each element in the first image data set as one of two states, and generating a second difference map further may include representing each element in the second image data set as one of two states, where the two states represent whether the value is consistent with the background.

In still other implementations, detecting may include identifying a cluster in each of the first and second difference maps, where each cluster has elements whose state within its associated difference map indicates that the elements are inconsistent with the background.

Identifying the cluster further may include reducing the difference map to one row by counting the elements within a column that are inconsistent with the background. Identifying the cluster further may include identifying the column as being within the cluster and classifying nearby columns as being within the cluster. Identifying the column as being within the cluster also may include identifying the median column.

Identifying the cluster further may include identifying a position associated with the cluster. Identifying the position associated with the cluster may include calculating the weighted mean of elements within the cluster.

Detecting further may include classifying the cluster as the object of interest. Classifying the cluster further may include counting the elements within the cluster and classifying the cluster as the object of interest only if that count exceeds a predefined threshold. Classifying the cluster further may include counting the elements within the cluster and counting a total number of elements classified as inconsistent within the background within the difference map, and classifying the cluster as the object of interest only if the ratio of the count of elements within the cluster over the total number of elements exceeds a predefined threshold.

The step of detecting further may include identifying a sub-cluster within the cluster that represents a pointing end of the object of interest and identifying a position of the sub-cluster.

In the above implementations, the object of interest may be a user's hand, and the method may include controlling an application program using the absolute position of the object of interest.

The above implementations further may include acquiring a third image and a fourth image representing different viewpoints of the object of interest, processing the third image into a third image data set and the fourth image into a fourth image data set, and processing the third image data set and the fourth image data set to generate the background data set associated with the background. The method also may include generating a third difference map by determining differences between the third image data set and the background data set, and a fourth difference map by determining differences between the fourth image data set and the background data set, and detecting a third relative position of the object of interest in the third difference map and a fourth relative position of the object of interest in the fourth difference map. The absolute position of the object of interest may be produced from the first, second, third and fourth relative positions of the object of interest.

As part of this implementation, the object of interest may be a user's hand, and also may include controlling an application program using the absolute position of the object of interest.

In another aspect, a method of tracking an object of interest controlled by a user to interface with a computer is disclosed. The method includes acquiring images from at least two viewpoints, processing the acquired images to produce an image data set for each acquired image, and comparing each image data set to one or more background data sets to produce a difference map for each acquired image. The method also includes detecting a relative position of an object of interest within each difference map, producing an absolute position of the object of interest from the relative positions of the object of interest, and using the absolute position to allow the user to interact with a computer application.

Additionally, this method may include mapping the absolute position of the object of interest to screen coordinates associated with the computer application, and using the mapped position to interface with the computer application. This method also may include recognizing a gesture associated with the object of interest by analyzing changes in the absolute position of the object of interest, and combining the absolute position and the gesture to interface with the computer application.

In another aspect, a multiple camera tracking system for interfacing with an application program running on a computer is disclosed. The multiple camera tracking system includes two or more video cameras arranged to provide different viewpoints of a region of interest and are operable to produce a series of video images. A processor is operable to receive the series of video images and detect objects appearing in the region of interest. The processor executes a process to generate a background data set from the video images, generate an image data set for each received video image and compare each image data set to the background data set to produce a difference map for each image data set, detect a relative position of an object of interest within each difference map, and produce an absolute position of the object of interest from the relative positions of the object of interest and map the absolute position to a position indicator associated with the application program.

In the above implementation, the object of interest may be a human hand. Additionally, the region of interest may be defined to be in front of a video display associated with the computer. The processor may be operable to map the absolute position of the object of interest to the position indicator such that the location of the position indicator on the video display is aligned with the object of interest.

The region of interest may be defined to be any distance in front of a video display associated with the computer, and the processor may be operable to map the absolute position of the object of interest to the position indicator such that the location of the position indicator on the video display is aligned to a position pointed to by the object of interest. Alternatively, the region of interest may be defined to be any distance in front of a video display associated with the computer, and the processor may be operable to map the absolute position of the object of interest to the position indicator such that movements of the object of interest are scaled to larger movements of the location of the position indicator on the video display.

The processor may be configured to emulate a computer mouse function. This may include configuring the processor to emulate controlling buttons of a computer mouse using gestures derived from the motion of the object of interest. A sustained position of the object of interest for a predetermined time period may trigger a selection action within the application program.

The processor may be configured to emulate controlling buttons of a computer mouse based on a sustained position of the object of interest for a predetermined time period. Sustaining a position of the object of interest within the bounds of an interactive display region for a predetermined time period may trigger a selection action within the application program.

The processor may be configured to emulate controlling buttons of a computer mouse based on a sustained position of the position indicator within the bounds of an interactive display region for a predetermined time period.

In the above aspects, the background data set may include data points representing at least a portion of a stationary structure. In this implementation, at least a portion of the stationary structure may include a patterned surface that is visible to the video cameras. The stationary structure may be a window frame. Alternatively, the stationary structure may include a strip of light.

In another aspect, a multiple camera tracking system for interfacing with an application program running on a computer is disclosed. The system includes two or more video cameras arranged to provide different viewpoints of a region of interest and are operable to produce a series of video images. A processor is operable to receive the series of video images and detect objects appearing in the region of interest. The processor executes a process to generate a background data set from the video images, generate an image data set for each received video image, compare each image data set to the background data set to produce a difference map for each image data set, detect a relative position of an object of interest within each difference map, produce an absolute position of the object of interest from the relative positions of the object of interest, define sub regions within the region of interest, identify a sub region occupied by the object of interest, associate an action with the identified sub region that is activated when the object of interest occupies the identified sub region, and apply the action to interface with the application program.

In the above implementation, the object of interest may be a human hand. Additionally, the action associated with the identified sub region may emulate the activation of keys of a keyboard associated with the application program. In a related implementation, sustaining a position of the object of interest in any sub region for a predetermined time period may trigger the action.

The details of one or more implementations are set forth in the accompanying drawings and the description below. Other features and advantages will be apparent from the description and drawings, and from the claims.

DESCRIPTION OF DRAWINGS

FIG. 5C shows sample image data, presented as a grayscale bitmap image, generated by part of the process shown in FIG. 4.

Like reference symbols in the various drawings indicate like elements.

DETAILED DESCRIPTION

Figure 1:
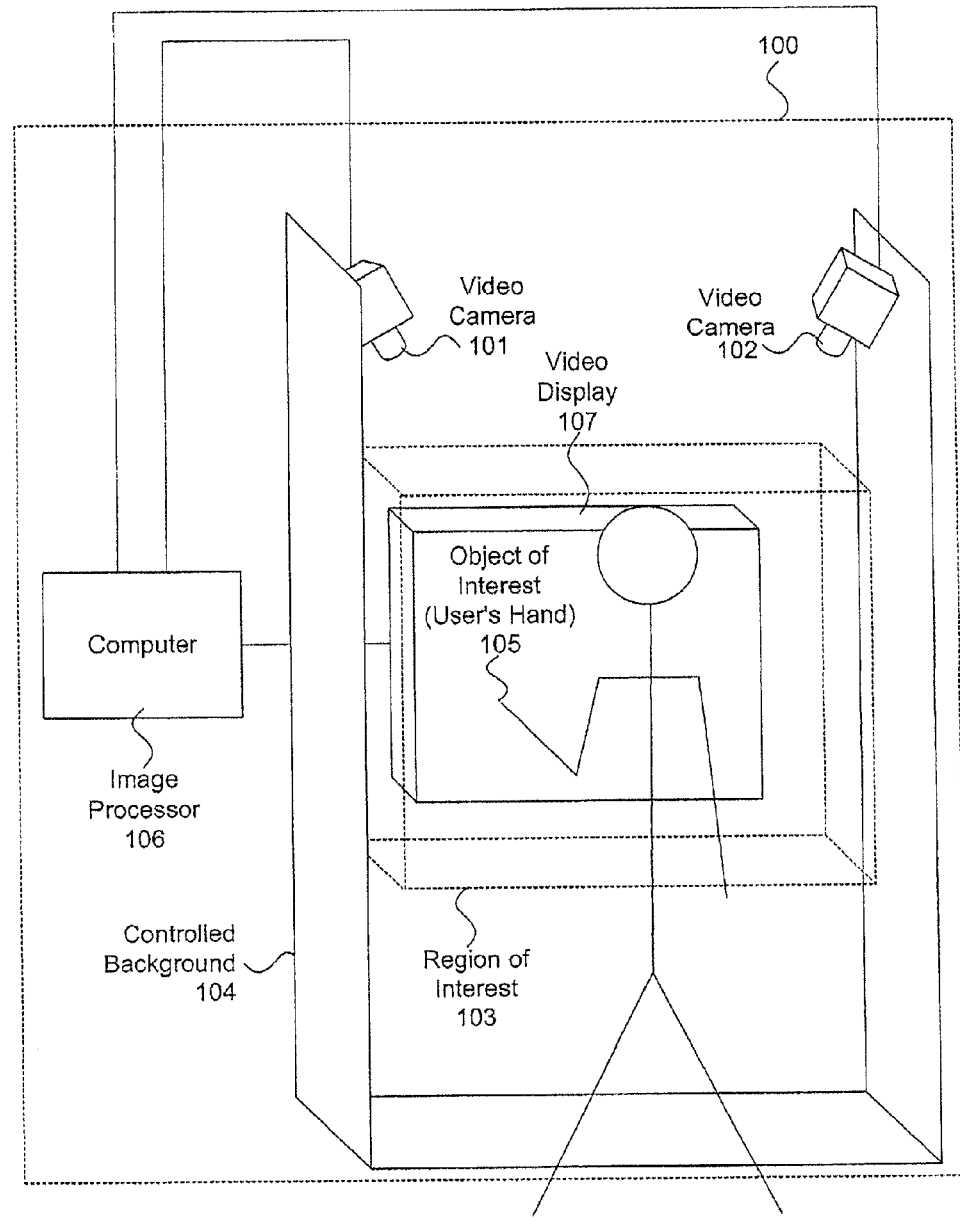
FIG. 1 shows the hardware components of a typical implementation of the multicamera control system, and their typical physical layout.

FIG. 1 shows a multicamera motion tracking and control system 100 interfaced with an image viewing system. In this implementation two cameras 101 and 102 scan a region of interest 103. A controlled or known background 104 surrounds the region of interest 103. An object of interest 105 is tracked by the system when it enters the region of interest 103. The object of interest 105 may be any generic object inserted into the region of interest 103, and is typically a hand or finger of a system user. The object of interest 105 also may be a selection device such as a pointer.

The series of video images acquired from the cameras 101 and 102 are conveyed to a computing device or image processor 106. In this implementation, the computing device is a general-purpose computer that runs additional software that provides feedback to the user on a video display 107.

Figure 2A:
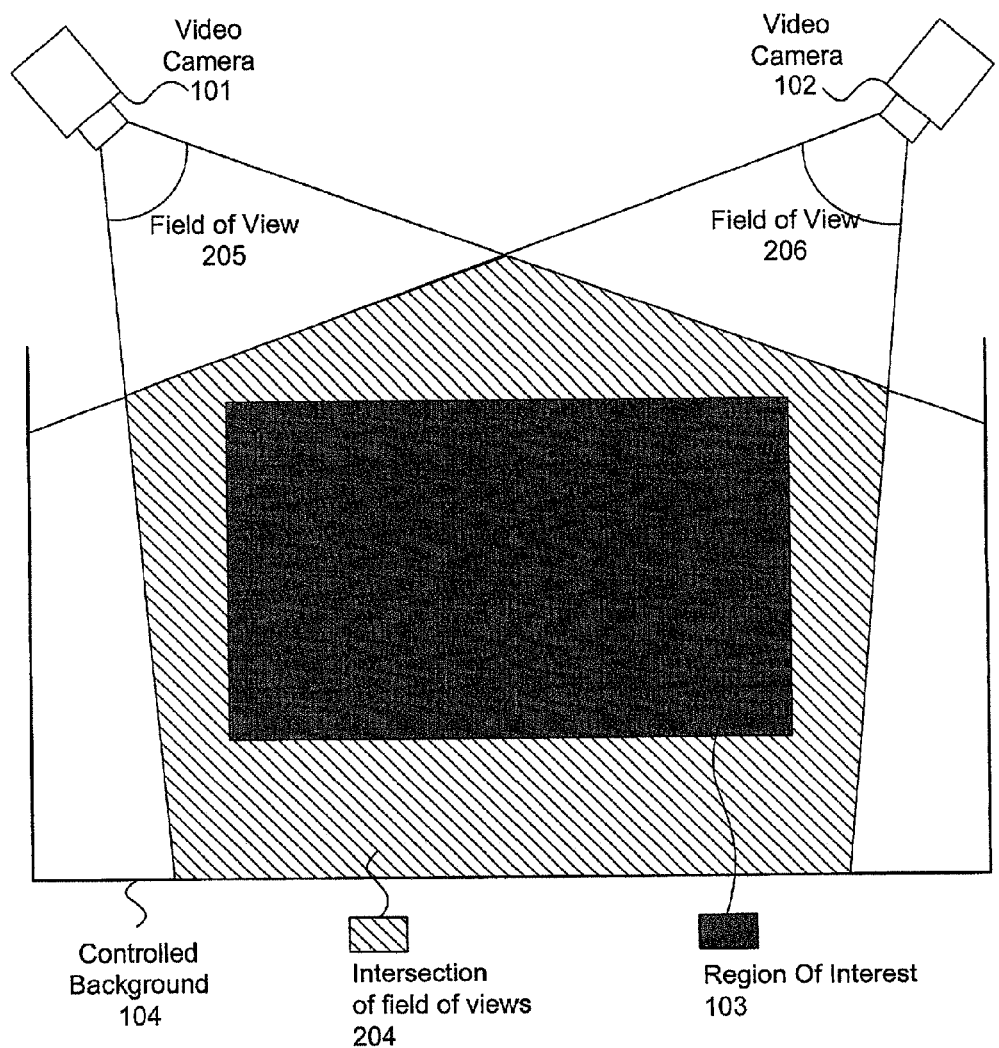
FIG. 2A shows the typical geometric relationship between the cameras and various image regions of FIG. 1.
Figure 2B:
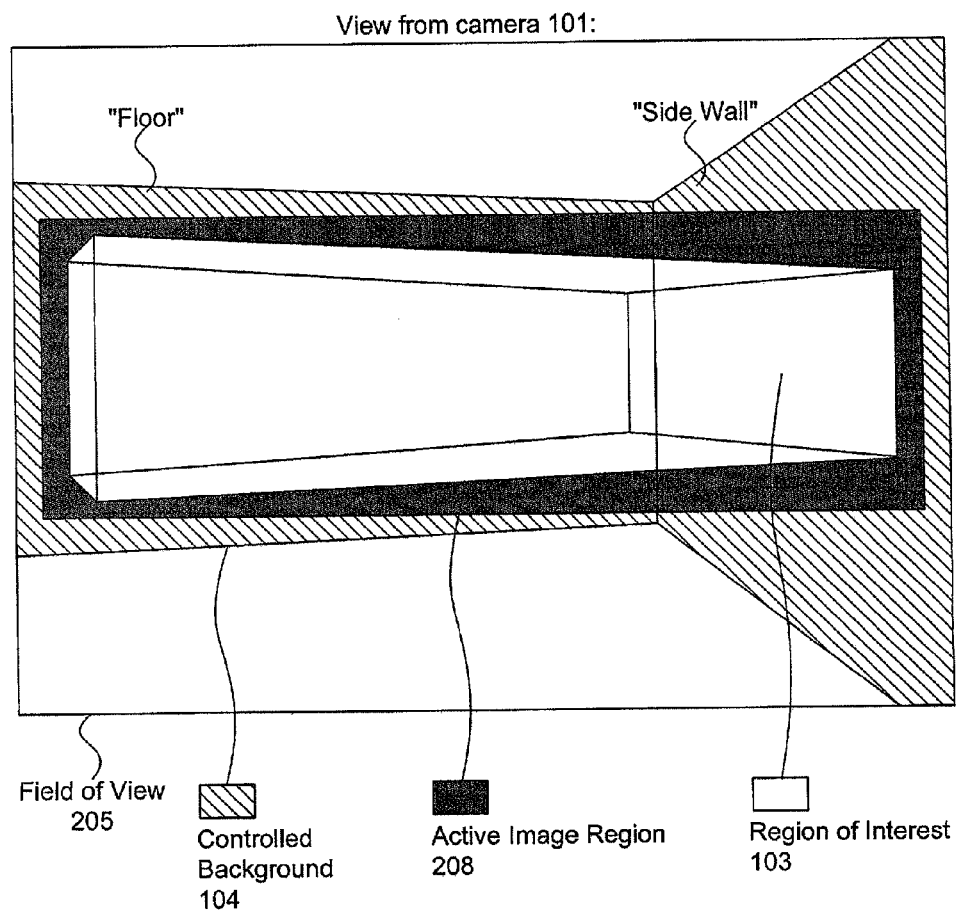
FIG. 2B shows a typical image captured by one of the cameras of FIG. 1.

FIG. 2A illustrates a typical implementation of the multicamera control system 100. The two cameras 101 and 102 are positioned outside of the region of interest 103. The cameras are oriented so that the intersection 204 of their field of views (205 for camera 101, 206 for camera 102) completely encompasses the region of interest 103. The orientation is such that the cameras 101, 102 are rotated on axes that are approximately parallel. In this example, a floor or window ledge and sidewalls provide a controlled background 104 having distinct edges. The corresponding view captured by camera 101 is shown in FIG. 2B. While not shown, it should be understood that the view captured by camera 102 is a mirror image of the view captured by camera 101. The controlled background 104 may not cover the camera's entire field of view 205. For each camera, an active image region 208 is found that is entirely contained within the controlled background 104, and also contains the entire region of interest 103. The background 104 is controlled so that a characteristic of the background can be modeled, and the object of interest 105, either in part or in whole, differs from the background 104 in that characteristic. When the object of interest 105 appears within the region of interest 103, the object 105 will occlude a portion of the controlled background 104 within the active image region 208 of each camera 101, 102. In the location of the occlusion, either as a whole or in parts, the captured images will, in terms of the selected characteristic, be inconsistent with the model of the controlled background 104.

In summary, the object of interest 105 is identified and, if found, its position within the active image region 208 of both cameras is calculated. Using the position data of each camera 101, 102, as well as the positions of the cameras relative to the region of interest 103, and parameters describing the cameras, the position of the object of interest 105 within the region of interest 103 is calculated.

Figure 3:
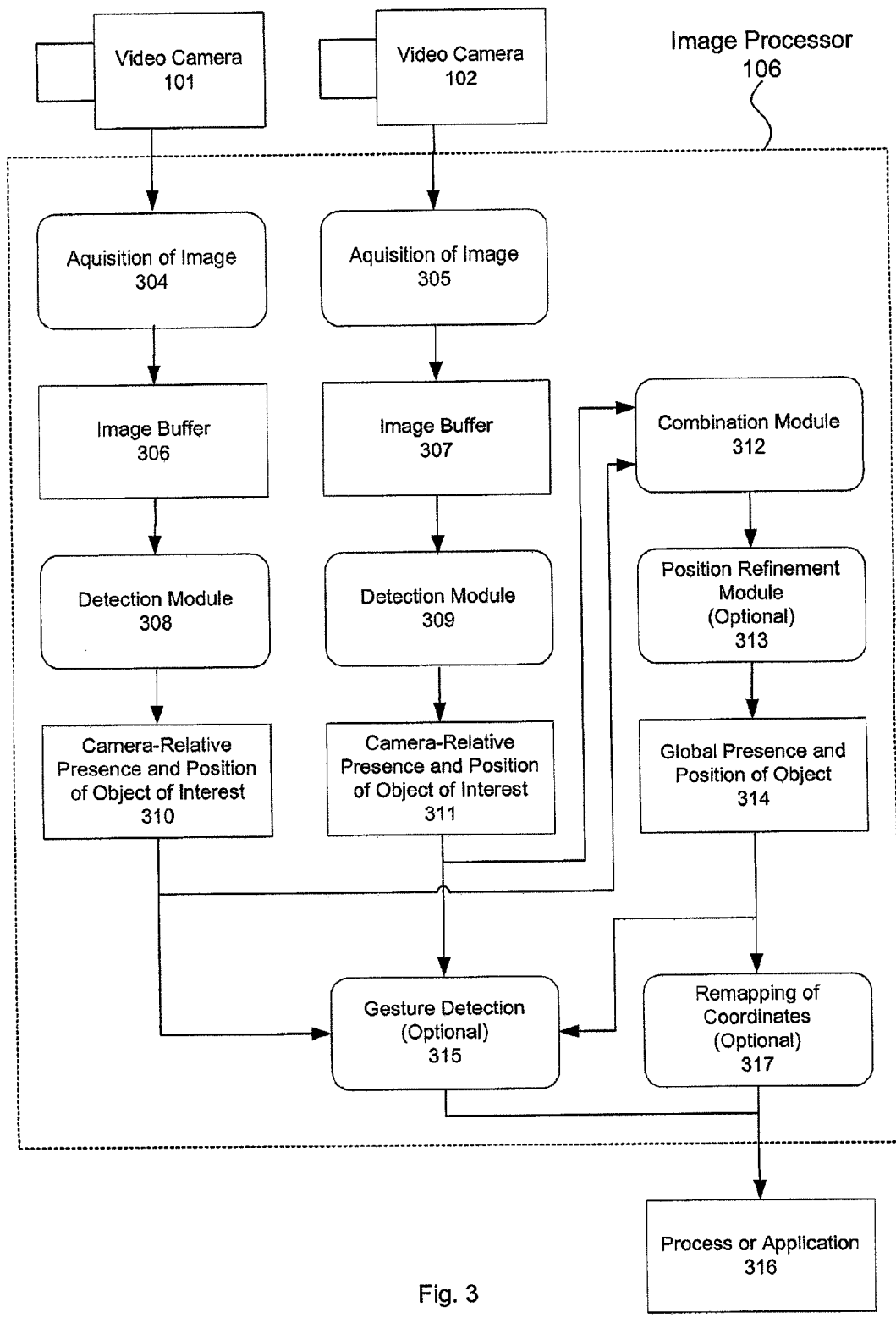
FIG. 3 is a flow diagram showing the processes that are performed, typically within a microcomputer program associated with the multicamera control system.

The processes performed by the image processor 106 (FIG. 1), which may be implemented through a software process, or alternatively through hardware, are generally shown in FIG. 3. The camera images are simultaneously conveyed from the cameras 101, 102 and captured by image acquisition modules 304, 305 (respectively) into image buffers 306, 307 (respectively) within the image processor 106. Image detection modules 308, 309 independently detect the object of interest 105 in each image, and determine its position relative to the camera view. The relative position information 310, 311 from both camera views is combined by a combination module 312 and optionally refined by a position refinement module 313, to determine at block 314, the global presence and position of the object of interest 105 within the region of interest 103. Optionally, specific gestures performed by the user may be detected in a gesture detection module 315. The results of the gesture detection process are then conveyed to another process or application 316, either on the same image processor 106 or to another processing device. The process of gesture detection is described in greater detail below.

Figure 4:
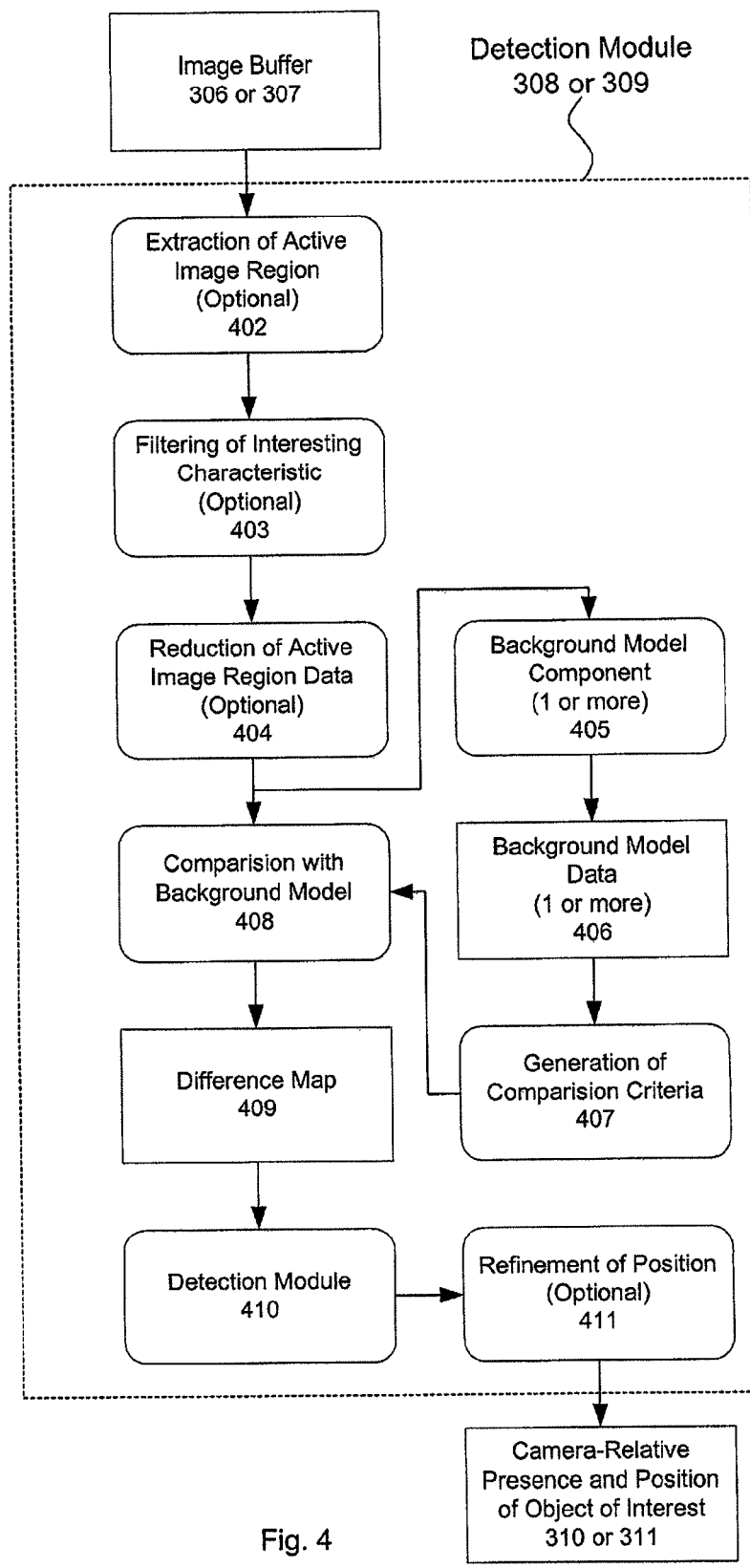
FIG. 4 is a flow diagram showing a portion of the process shown in FIG. 3 in greater detail, and in particular, the processes involved in detecting an object and extracting its position from the image signals captured by the cameras.

Image detection modules 308 and 309 are identical in the processes that they execute. An implementation of these image detection modules 308, 309 is shown in FIG. 4. In block 402, the image processor 106 extracts, from the captured image data stored in the image buffers 306 or 307, the image data that corresponds to the active image region 208 (of FIG. 2B). The image may be filtered in a filtering process 403 to emphasize or extract the aspects or characteristics of the image where the background 104 and object of interest 105 differ, but are otherwise invariant within the background 104 over time. In some implementations, the data representing the active image region may also be reduced by a scaling module 404 in order to reduce the amount of computations required in later processing steps. Using the resulting data, the background 104 is modeled by one or more instances of a background model process at block 405 to produce one or more descriptions represented as background model data 406 of the controlled background 104. Therefore the background 104 is modeled in terms of the desired aspects or characteristics of the image. The background model(s) 406 are converted into a set of criteria in process 407. In a comparison process 408, the filtered (from process 403) and/or reduced (from module 404) image data is compared to those criteria (from process 407), and the locations where the current data is inconsistent with the background model data 406, that is where the criteria is not satisfied, are stored in an image or difference map 409. In detection module 410, the difference map 409 is analyzed to determine if any such inconsistencies qualify as a possible indication of an object of interest 105 and, if these criteria are satisfied, its position within the camera view (205 or 206) is determined. The position of the object 105 may be further refined (optionally) at block 411, which produces a camera-relative presence and position output 310 or 311 associated with the object of interest 105 (as described above with respect to FIG. 3).

In block 402 of FIG. 4, image processor 106 extracts the image data that corresponds to the active image region 208 (of FIG. 2B). The image data may be extracted by cropping, shearing, rotating, or otherwise transforming the captured image data. Cropping extracts only the portion of the overall image that is within the active image region 208. Bounds are defined, and any pixels inside the bounds are copied, unmodified, to a new buffer, while pixels outside of the bounds are ignored. The active image region 208 may be of arbitrary shape. Shearing and rotation reorder the data into an order that is more convenient for further processing, such as a rectangular shape so that it may be addressed in terms of rows and columns of pixels.

Rotation causes the contents of an image to appear as if the image has been rotated. Rotation reorders the position of pixels from (x,y) to (x',y') according to the following equation:

$$\begin{bmatrix} x' \\ y' \\ 1 \end{bmatrix} = \begin{bmatrix} \cos\theta & -\sin\theta & 0 \\ \sin\theta & \cos\theta & 0 \\ 0 & 0 & 1 \end{bmatrix} \begin{bmatrix} x \\ y \\ 1 \end{bmatrix}$$

where θ is the angle that the image is to be rotated.

If the cameras 101 and 102 are correctly mounted with respect to the region of interest 103, the desired angle of rotation will typically be small. If the desired angle of rotation is small, shearing may be used to provide an approximation that is computationally simpler than rotation. Shearing distorts the shape of an image such that the transformed shape appears as if the rows and columns have been caused to slide over and under each other. Shearing reorders the position of pixels according to the following equations:

$$\begin{bmatrix} x' \\ y' \\ 1 \end{bmatrix} = \begin{bmatrix} 1 & sh_x & 0 \\ 0 & 1 & 0 \\ 0 & 0 & 1 \end{bmatrix} \begin{bmatrix} x \\ y \\ 1 \end{bmatrix} \text{ and } \begin{bmatrix} x' \\ y' \\ 1 \end{bmatrix} = \begin{bmatrix} 1 & 0 & 0 \\ sh_y & 1 & 0 \\ 0 & 0 & 1 \end{bmatrix} \begin{bmatrix} x \\ y \\ 1 \end{bmatrix}$$

where $sh_x$ represents the amount of horizontal shear within the image, and $sh_y$ represents the amount of vertical shear within the image.

An implementation of the multicamera control system 100 applies in scenarios where the object of interest 105, either in whole or in part, is likely to have either higher or lower luminance than the controlled background 104. For example, the background 104 may be illuminated to create this scenario. A filtering block 403 passes through the luminance information associated with the image data. A single background model 406 represents the expected luminance of the background 104. In practice, the luminance of the controlled background 104 may vary within the active image region 208, therefore the background model 406 may store the value of the expected luminance for every pixel within the active image region 208. The comparison criteria generation process 407 accounts for signal noise (above that which may be accounted for within the background model) and minor variability of the luminance of the controlled background 104 by modifying each luminance value from the background model 406, thus producing the minimal luminance value that may be classified as being consistent with the background model 406. For example, if the luminance of the controlled background 104 is higher than the luminance of the object of interest 105, then processes block 407 decreases the luminance value of each pixel by an amount greater than the expected magnitude of signal noise and variability of luminance.

In some implementations of system 100, the region of interest 103 is sufficiently narrow such that it may be modeled as a region of a plane. The orientation of that plane is parallel to the front and rear faces of the dotted cube that represents the region of interest 103 in FIG. 1. The active image region 208 may be reduced to a single row of pixels in the optional scaling module 404 if two conditions are satisfied: 1) the object of interest 105, when it is to be detected, will occlude the background 104 in all rows of some columns of the active image region 208, and 2) a single set of values in the background model 406 sufficiently characterizes an entire column of pixels in the active image region 208. The first condition is usually satisfied if the active image region 208 is thinner than the object of interest 105. The second condition is satisfied by the implementation of blocks 403, 405, 406 and 407 described above. Application of the scaling module 404 reduces the complexity of processing that is required to be performed in later processes, as well as reducing the storage requirements of the background model(s) 406.

The particular implementation of the scaling module 404 depends on the specifics of processing blocks 403, 405, 406 and 407. If the luminance of the controlled background 104 is expected to be higher than that of the object of interest 105, as described above, one implementation of the scaling module 404 is to represent each column by the luminance of greatest magnitude within that column. That is to say, for each column, the highest value in that column is copied to a new array. This process has the added benefit that the high-luminance part of the controlled background 104 need not fill the entire controlled background 104.

Figure 5A:
FIG. 5A shows sample image data, presented as a grayscale bitmap image, acquired by a camera and generated by part of the process shown in FIG. 4.
Figure 5B:
FIG. 5B shows sample image data, presented as a grayscale bitmap image, generated by part of the process shown in FIG. 4.
Figure 5D:
FIG. 5D shows sample image data, presented as a grayscale bitmap image, generated by part of the process shown in FIG. 4.
Figure 5D:
Figure 5E:
FIG. 5E shows sample data, presented as a binary bitmap image, identifying those pixels that likely belong to the object that is being tracked in the sample, generated by part of the process shown in FIG. 4.

An alternative implementation applies in scenarios where the controlled background 104 is static, that is, contains no motion, but is not otherwise limited in luminance. A sample source image is included in FIG. 5A as an example. In this case, the object of interest, as sensed by the camera, may contain, or be close in magnitude to, the luminance values that are also found within the controlled background 104. In practice, the variability of luminance of the controlled background 104 (for example, caused by a user moving in front of the apparatus thereby blocking some ambient light) may be significant in magnitude relative to the difference between the controlled background 104 and the object of interest 105. Therefore, a specific type of filter may be applied in the filtering process 403 that produces results that are invariant to or de-emphasize variability in global luminance, while emphasizing parts of the object of interest 105. A 3×3 Prewitt filter is typically used in the filtering process 403. FIG. 5B shows the result of this 3×3 Prewitt filter on the image in FIG. 5A. In this implementation, two background models 406 may be maintained, one representing each of the high and low values, and together representing the range of values expected for each filtered pixel. The comparison criteria generation process 407 then decreases the low-value and increases the high-value by an amount greater than the expected magnitude of signal noise and variability of luminance. The result is a set of criterion, an example of which, for the low-value, is shown in FIG. 5C, and an example of which, for the high-value, is shown in FIG. 5D. These modified images are passed to the comparison process 408, which classifies pixels as being inconsistent to the controlled background 104 if their value is either lower than the low-value criterion (FIG. 5C) or higher than the high-value criterion (FIG. 5D). The result is a binary difference map 409, of which example corresponding to FIG. 5B is shown in FIG. 5E.

The preceding implementation allows the use of many existing surfaces, walls or window frames, for example, as the controlled background 104 where those surfaces may have arbitrary luminance, textures, edges, or even a light strip secured to the surface of the controlled background 104. The above implementation also allows the use of a controlled background 104 that contains a predetermined pattern or texture, a stripe for example, where the above processes detect the lack of the pattern in the area where the object of interest 105 occludes the controlled background 104.

The difference map 409 stores the positions of all pixels that are found to be inconsistent with the background 104 by the above methods. In this implementation, the difference map 409 may be represented as a binary image, where each pixel may be in one of two states. Those pixels that are inconsistent with the background 104 are identified or "tagged" by setting the pixel in the corresponding row and column of the difference map to one of those states. Otherwise, the corresponding pixel is set to the other state.

Figure 6:
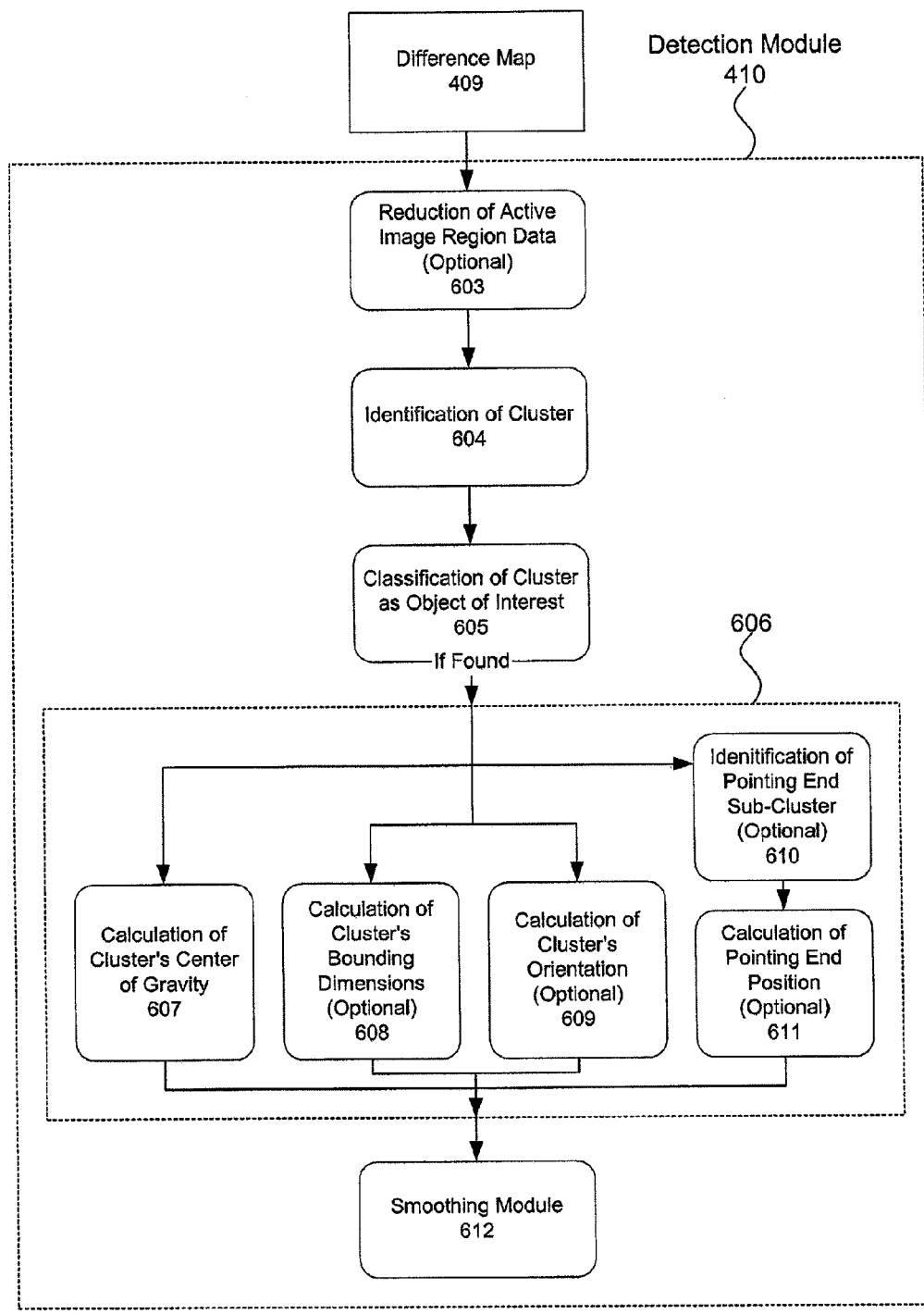
FIG. 6 is a flow diagram showing a portion of the process described in FIG. 4 in greater detail, and in particular, the processes involved in classifying and identifying the object given a map of pixels that have been identified as likely to belong to the object that is being tracked, for example given the data shown in FIG. 5E.
Figure 7A:
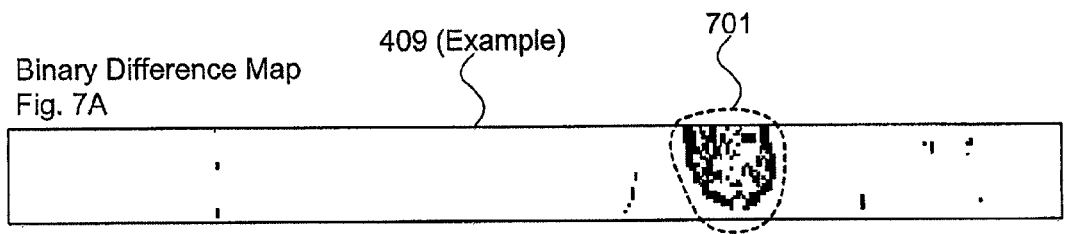
FIG. 7A shows the sample data presented in FIG. 5E, presented as a binary bitmap image, with the identification of those data samples that the processes shown in FIG. 6 have selected as belonging to the object in this sample.
Figure 7B:
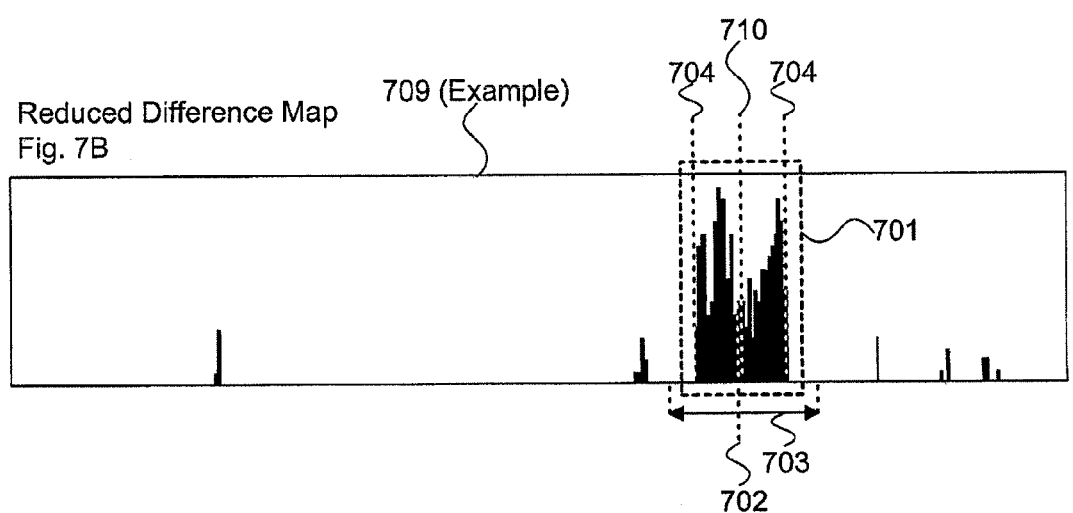
FIG. 7B shows the sample data presented in FIG. 5E, presented as a bar graph, with the identification of those data samples that the processes outlined in FIG. 6 have selected as belonging to the object, with specific points in the graph being identified.

An implementation of the detection module 410, which detects an object of interest 105 in the difference map 409, shown in FIG. 6. Another scaling module at block 603 provides an additional opportunity to reduce the data to a single dimensional array of data, and may optionally be applied to scenarios where the orientation of the object of interest 105 does not have a significant effect on the overall bounds of the object of interest 105 within the difference map 409. In practice, this applies to many scenarios where the number of rows is less than or similar to the typical number of columns that the object of interest 105 occupies. When applied, the scaling module at block 603 reduces the difference map 409 into a map of one row, that is, a single dimensional array of values. In this implementation, the scaling module 603 may count the number of tagged pixels in each column of the difference map 409. As an example, the difference map 409 of FIG. 7A is reduced in this manner and depicted as a graph 709 in FIG. 7B. Applying this optional processing step reduces the processing requirements and simplifies some of the calculations that follow.

Continuing with this implementation of the detection module 410, it is observed that the pixels tagged in the difference map (409 in example FIG. 7A) that are associated with the object of interest 105 will generally form a cluster 701, however the cluster is not necessarily connected. A cluster identification process 604 classifies pixels (or, if the scaling module 603 has been applied, classifies columns) as to whether they are members of the cluster 701. A variety of methods of finding clusters of samples exist and may be applied, and the following methods have been selected on the basis of processing simplicity. It is noted that, when the object of interest 105 is present, it is likely that the count of correctly tagged pixels will exceed the number of false-positives. Therefore the median position is expected to fall somewhere within the object of interest 105. Part of this implementation of the cluster identification process 604, when applied to a map of one row (for example, where the scaling module at block 603 or 404 has been applied), is to calculate the median column 702 and tag columns as part of the cluster 701 (FIG. 7B) if they are within a predetermined distance 703 that corresponds to the maximum number of columns expected to be occupied. Part of this implementation of the cluster identification process 604, when applied to a map of multiple rows, is to add tagged pixels to the cluster 703 if they meet a neighbor-distance criterion.

In this implementation, a set of criteria is received by a cluster classification process 605 and is then imposed onto the cluster 701 to verify that the cluster has qualities consistent with those expected of the object of interest 105. Thus, process 605 determines whether the cluster 701 should be classified as belonging to the object of interest 105. Part of this implementation of the cluster classification process 605 is to calculate a count of the tagged pixels within the cluster 701 and to calculate a count of all tagged pixels. The count within the cluster 701 is compared to a threshold, eliminating false matches in clusters having too few tagged pixels to be considered as an object of interest 105. Also, the ratio of the count of pixels within the cluster 701 relative to the total count is compared to a threshold, further reducing false matches.

If the cluster 701 passes these criteria, a description of the cluster is refined in process block 606 by calculating the center of gravity associated with the cluster 701 in process 607. Although the median position found by the scaling module 603 is likely to be within the bounds defining the object of interest 105, it is not necessarily at the object's center. The weighted mean 710, or center of gravity, provides a better measure of the cluster's position and is optionally calculated within process 606, as sub-process 607. The weighted mean 710 is calculated by the following equation:

$$\bar{x} = \frac{\sum_{x=0}^{c-1} x \cdot C[x]}{\sum_{x=0}^{c-1} C[x]}$$

where:
$\bar{x}$ is the mean
c is the number of columns
C[x] is the count of tagged pixels in column x.

The cluster's bounds 704 may also be optionally calculated within process 606, shown as process 608. The cluster 703 may include some false-positive outliers, so as part of this implementation, the bounds may be defined as those that encompass a predetermined percentile of the tagged pixels, or, in scenarios where relatively few pixels are expected to be tagged, encompasses those tagged pixels (or columns, if scaling module 603 is applied) that form tight sub-clusters, that is those tagged pixels (or columns) that have neighbors that are also tagged.

In addition to the middle and bound coordinates, the orientation of the object of interest 105 may optionally be inferred by calculation of the moments of the cluster. This calculation is represented by a cluster orientation calculation process at sub-process 609 within process 606.

Figure 7C:
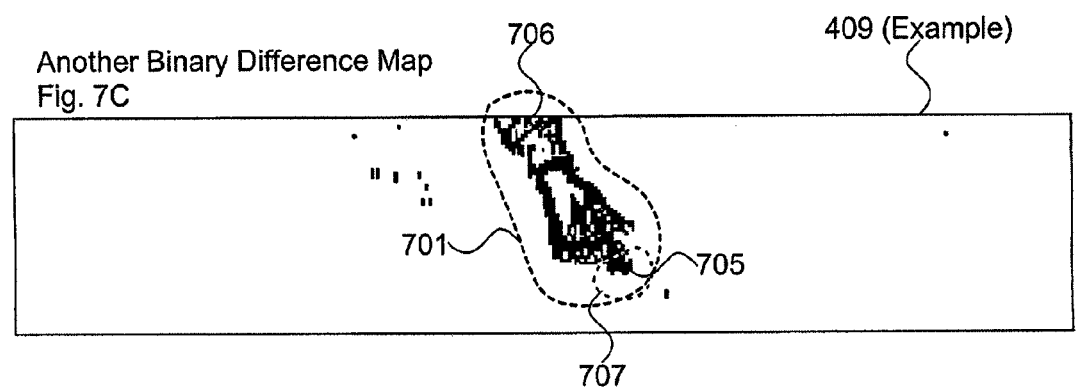
FIG. 7C shows a difference set of sample data, presented as a binary bitmap image, with the identification of those data samples that the processes shown in FIG. 6 have selected as belonging to the object and key parts of the object in this sample.

In some applications of the system 100, the object of interest 105 is used as a pointer. In this case, the "pointing end" of the object 105 is desired and may also be determined by a pointing end calculation sub-process within process 606 if the region of interest 103 contains a sufficient number of rows and the number of rows has not been reduced. An example is depicted in FIG. 7C. The object of interest 105 will typically enter, or be constrained to enter, the active image region 208 from a known border of that region. The pointing end 705 (for example the user's fingertip) of the object of interest 105 is likely to be the portion of the cluster 701 that is furthest from the region of entry 706 into the active image region 208. The cluster 701 may include some false-positive outliers. As such, the pointing end 705 may be defined as the region 707 within the cluster 701 that encompasses multiple tagged pixels near the furthest bounding side of the cluster 701, or, in scenarios where relatively few pixels are expected to be tagged, encompasses the furthest tagged pixels that form a tight sub-cluster; that is those tagged pixels that have neighbors that are also tagged. This sub-cluster is identified by a sub-cluster pointing end process 610, and the position of the sub-cluster is found in process 611.

Continuing with this implementation, a process implemented by a smoothing module 612 may optionally be applied to any or all of the positions found in process 606. Smoothing is a process of combining the results with those solved previously so they move in a steady manner from frame to frame. The weighted mean coordinate 710, found by the center of gravity determination process 607, is dependent on many samples and therefore is inherently steady. The bound 704, found by the cluster bounding dimension determination process 608, and pointing end 705, found by 611, coordinates are dependent on relatively fewer members of the cluster, and the state of a single pixel may have a significant effect. Since the size of the region occupied by the object of interest 105 is expected to remain relatively steady, smoothing may be applied to the distance between the bounds 704 measured relative to the cluster's weighted mean coordinate 710. Since the shape and orientation of the object of interest 105 is expected to change less rapidly than the overall position object of interest 105, smoothing may be applied to the distance of the pointing end 705 measured relative to the cluster's weighted mean coordinate 710.

A process used in the center of gravity process 607 is Eq. 1 as follows:

$$s(t) = (a \times r(t)) + ((1-a) \times s(t-1))$$

In Eq. 1, the smoothed value at time t (s(t)) is equal to one minus the scalar value (a) multiplied by the smoothed value at time minus one (t−1). This amount is added to the raw value at time t (r(t)) multiplied by a scalar (a) that is between zero and one.

Figure 8:
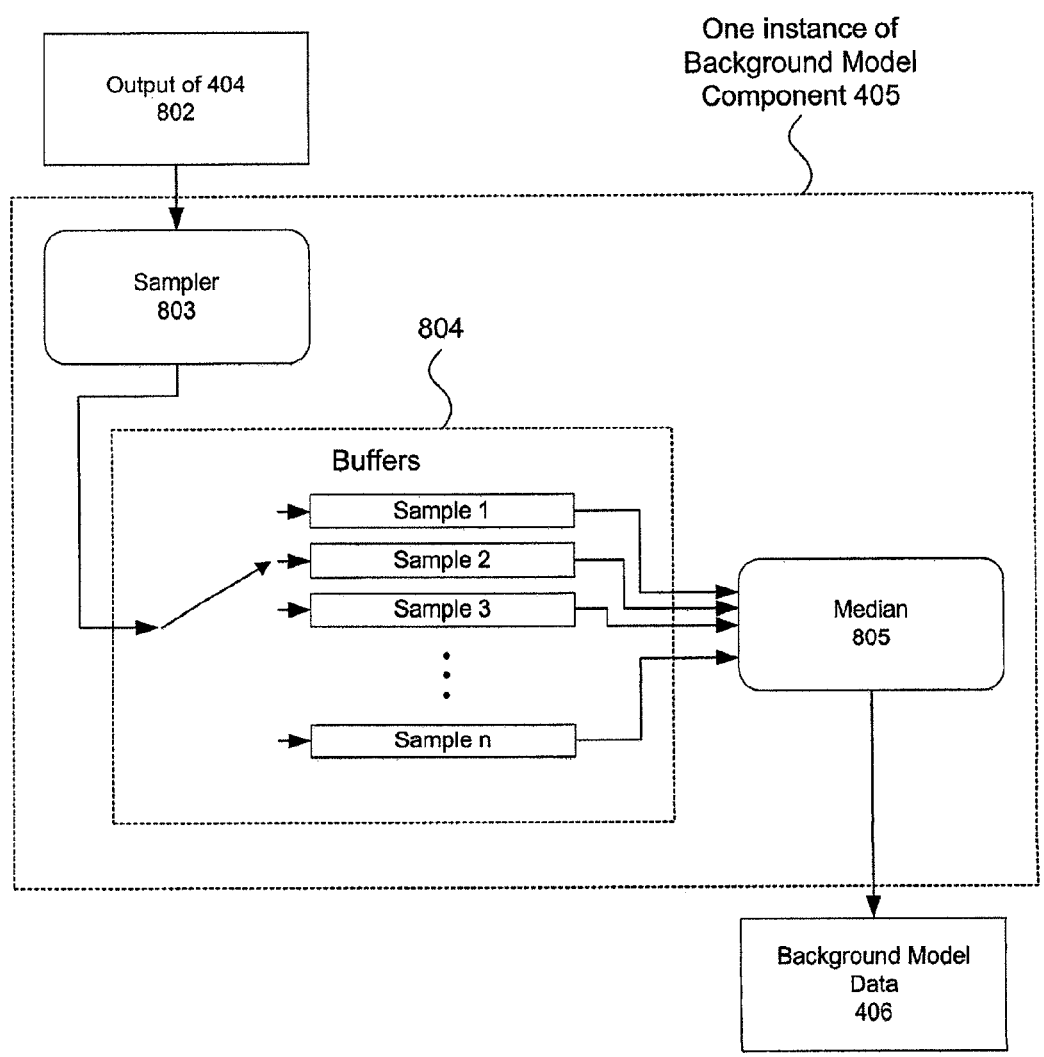
FIG. 8 is a flow diagram that shows a part of the process shown in FIG. 4 in greater detail, and in particular, the processes involved in generating and maintaining a description of the background region over which the object occludes.

Referring to FIG. 8, implementations of system 100 make use of, as described above, one or more background models 406 (FIG. 4). An implementation of the background model process or component 405 that generates the background model data 406 is shown in FIG. 8. This implementation of the background model component 405 automatically generates and dynamically updates the background model, allowing unattended operation of the system.

Input data 802 is provided by the output of scaling module 404 for this implementation of the background model component 405. Input is available every frame, and is sampled in a sampling process 803. The sample may contain the object of interest 105 occluding part of the controlled background 104. For each pixel, a range of values may be a better representative of the background 104 than a single value. By including the effects of this range in the background model, the expansion in process 407 may be made tighter. Contributing multiple frames of data to the sample allows this range to be observed, but also increases the portion of the background 104 that is occluded by the object of interest 105 if the object of interest 105 is in motion while the frames are being sampled. The optimal number of frames to use is dependent on the expected motion of the object of interest 105 in the particular application of the system. In practice, for systems that are tracking a hand, 10 frames, representing approximately 0.33 seconds, is sufficient to observe the majority of that range without allowing motion of the object of interest to occlude an undue portion of the background. If the particular background model is to be compared in comparison process 408 as the upper bound on values that are considered to be consistent with the background 104, then the maximum value of each pixel observed in the multiple frames may be recorded as the sample value. If the particular background model 406 is to be compared in process 408 as the lower bound on values that are considered to be consistent with the background 104, then the minimum value of each pixel observed in the multiple frames may be recorded as the sample value.

In this implementation of the background model component 405, samples from the sampling process 803 are added to a buffer 804 having storage locations to store n samples, where the oldest sample in the history is replaced. The history therefore contains n sampled values for each pixel. The span of time, d, represented in the buffer is dependent on the rate that new samples are acquired and added to the history, r, by Eq. 2, described as follows:

$$d = \frac{n}{r}$$

In this implementation, a median process block 805 selects, for each pixel, a value that it determines is representative of the controlled background 104 at the location represented by that pixel. One method of selecting a value representative of the controlled background 104 within process block 805 is to select the median value of the n samples of each pixel. For any pixel, a number of the n sampled values in the buffer 804 may represent the object of interest 105. Duration d is selected so that it is unlikely that the object of interest 105 will occlude any one pixel of the controlled background 104 for an accumulated duration of d/2 or longer within any time-span of d. Therefore, for any pixel, the majority of the sampled values will be representative of the background 104, and therefore the median of the sampled values will be a value representative of the background 104.

The background model component 405 is adaptive, and any changes to the background 104 will be reflected in the output of median process block 805 once they have been observed for time of d/2. This system does not require that the entire controlled background 104 be visible when initialized, the object of interest 105 may be present when initialized, however it does require that samples be observed for time of d before providing output. Optionally, the constraint may be applied that the object of interest 105 must be absent when the system is initialized, in which case the first observed sample values may be copied into all n samples of the buffer 804, allowing the system to produce an output sooner.

The duration that any one pixel of the controlled background 104 will be occluded by the object of interest 105, and therefore the duration d, is dependent on the particular application of the system. The number of samples, n, can be scaled for the memory buffer and processing power available.

The preceding discussion presents one implementation of obtaining the position of the object of interest 105 within and relative to the images acquired by the cameras 101 and 102. If the object of interest 105 was successfully detected and its coordinates found in both cameras views 205 and 206 by detection modules 308 and 309 of FIG. 3, then the combination of these coordinates is sufficient to recover the position of the object of interest 105 within the region of interest 103. In the implementation outlined in FIG. 3, the position of the object of interest 105 is calculated in combination module 312.

Figure 9A:
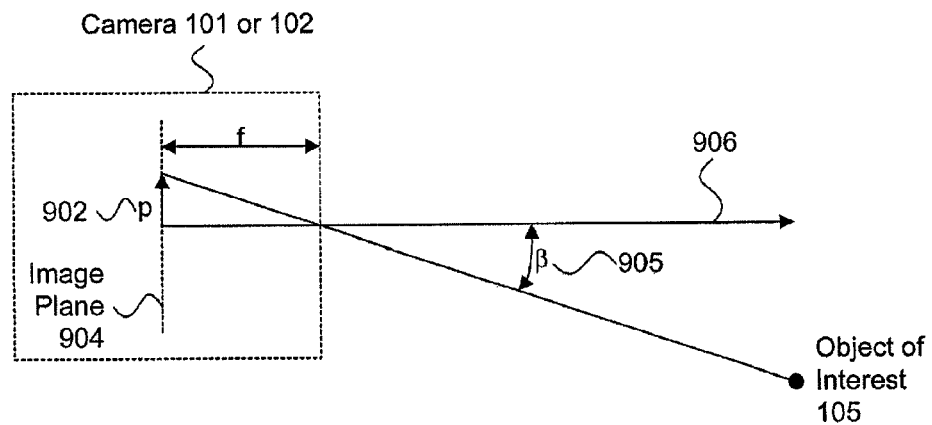
FIG. 9A shows the geometry on which Eq. 3 is based, that is, an angle defining the position of the object within the camera's field of view, given the location on the image plane where the object has been sensed.
Figure 9B:
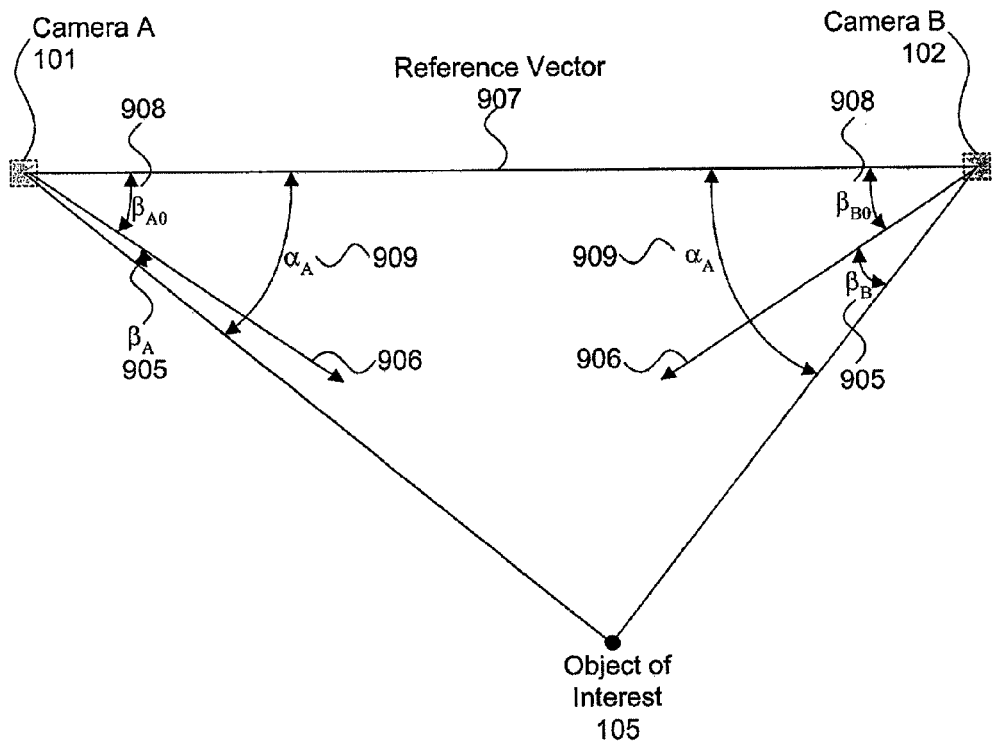
FIG. 9B shows the geometry on which Eq. 4, 5 and 6 are based, that is, the relationship between the positions of the cameras and the object that is being tracked.

Turning to FIGS. 9A and 9B, an implementation of the combination module 312 is shown. For each camera 101 and 102, the position p 902 of the object of interest 105 on the camera's image plane 904 is converted to an angle 905, which is referred in this description as beta ($\beta$), and is measured on the reference plane whose normal is defined by the axes of the rotations of the cameras 101, 102. (In practice, the axes are not precisely parallel and do not exactly define a single plane, however the process described herein is tolerant of that error). By approximating the camera 101, 102 as an ideal pinhole model of the camera, that angle ($\beta$), relative to the vector 906 defining the orientation of the camera, is approximated.

Eq. 3, as shown in FIG. 9A, illustrates an approximation calculation as follows:

$$\beta = \tan^{-1}\left(\frac{f}{p}\right)$$

To approximate the angle beta (β), the inverse tangent is applied to the quantity of the focal length (f) divided by the position p on the image plane projected onto the intersection of the reference plane and the image plane.

For maximum precision, the intrinsic camera parameters (location of the principal point and scale of image) and radial distortion caused by the lens should be corrected for by converting the distorted position (as represented by the relative position information 310, 311) to the ideal position. More specifically, the ideal position is the position on the image plane 904 that the object 105 would be projected if the camera 101, 102 had the properties of an ideal pinhole camera, whereby Eq. 3 will produce the exact angle. One set of correction equations are presented in Z. Zhang, A Flexible New Technique for Camera Calibration, Microsoft Research, http://research.microsoft.com/~zhang, which is incorporated by reference. For many applications of the system, the approximation has been found to provide sufficient precision without this correction noted above.

Continuing with the description of combination module 312, a reference vector 907, as illustrated in FIG. 9B, is defined such that it passes through the positions of both cameras 101 and 102 on the reference plane where the reference plane is defined such that the axis of rotation of the cameras define the normal of the reference plane. The angles 908 that the cameras are rotated are measured relative to the reference vector 907.

A formula for measurement of the angles is shown in Eq. 4:

$$\alpha = \beta_0 + \beta$$

Measurement of the angle alpha (α) is equal to the angle beta_not ($\beta_0$) and the angle beta (β).

Eq. 4 is applied to measure the angles 909 of the object of interest 105 relative to the reference vector 907. That angle is referred to by the alpha (α) symbol herein. The angle alpha 909 for each camera 101 and 102, and the length of the reference vector 907, are sufficient to find the position of the object of interest 105 on the reference plane, by Eq. 5 and Eq. 6.

Eq. 5 calculates the offset of the object of interest (y) by the formula:

$$y = \frac{w \tan\alpha_A \tan\alpha_B}{\tan\alpha_A + \tan\alpha_B}$$

The offset (y) is equal to the reciprocal of the tangent of the angle ($a_A$) for camera A 101 and the tangent of the angle ($a_B$) for camera B 102 multiplied by the vector length 907 (w), the tangent of the angle ($a_A$) for camera A 101 and the tangent of the angle ($a_B$) for camera B 102.

Eq. 6 calculates the offset of the object of interest ($x_A$) as follows:

$$x_A = \frac{y}{\tan\alpha_A}$$

In Eq. 6, the offset ($x_A$) is measured by the offset from Eq. 5 (y) divided by the tangent of the angle ($a_A$) for camera A 101.

The position of the object 105 on the axis perpendicular to the reference plane may be found by Eq. 7, which is applied to the position in each image, using the distance of the object of interest 105 from the camera.

$$z = l\frac{p}{f}$$

In Eq. 7, the position (z) is calculated as the position (p) on the image plane projected onto the vector of the image plane perpendicular to that use in Eq. 3 divided by the focal length (f) multiplied by the distance of the object of interest 105 from the camera (l).

These relations provide a coordinate of the object of interest 105 relative to Camera A 101. Knowing the position and size of the region of interest 103 relative to Camera A 101, the coordinate may be converted so that it is relative to the region of interest 103, 312 of FIG. 3.

Smoothing may optionally be applied to these coordinates in refinement module 313 of the implementation of this system shown in FIG. 3. Smoothing is a process of combining the results with those solved previously so that motion is steady from frame to frame. One method of smoothing for these particular coordinate values ($x_A$, y, z found by combination module 312) is described herein. Each of the components of the coordinate values associated with the object of interest 105, that is x, y, and z, are smoothed independently and dynamically. The degree of dampening S is calculated by Eq. 8, where S is dynamically and automatically adjusted in response to the change in position is calculated as follows:

$$S = \begin{cases} S_A & \text{if } (D \le D_A) \\ \alpha S_B + (1-\alpha)S_A & \text{where } \alpha = \frac{D-D_A}{D_B - D_A} \text{ if } (D_A < D < D_B) \\ S_B & \text{if } (D \ge D_B) \end{cases}$$

$$D = |r(t) - s(t-1)|$$

In Eq. 8, s(t) is the smoothed value at time t, r(t) is the raw value at time t, $D_A$ and $D_B$ are thresholds, and $S_A$ and $S_B$ define degrees of dampening.

Figure 10:
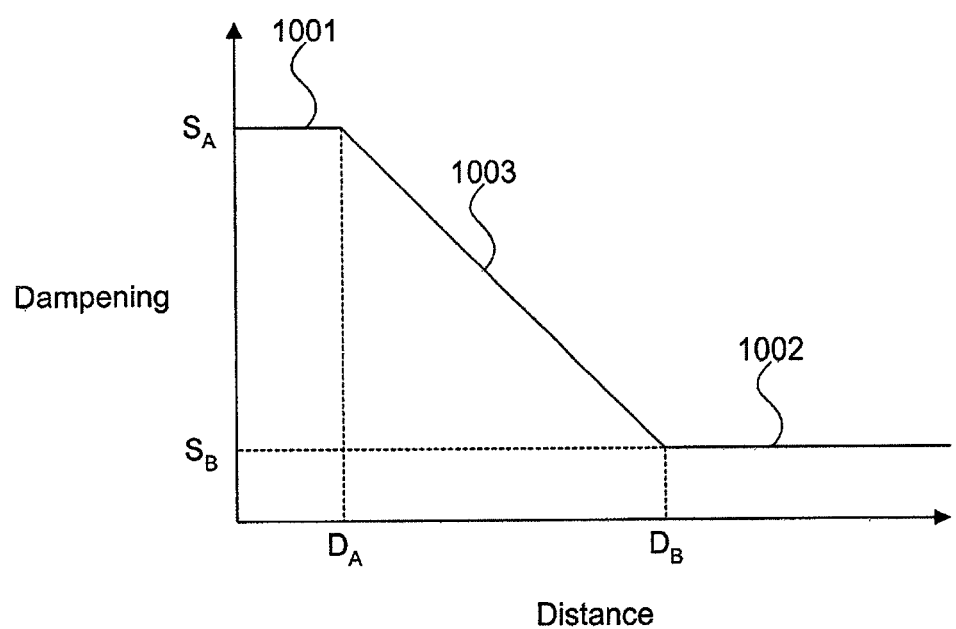
FIG. 10 is a graph illustrating Eq. 8, that is, the amount of dampening that may be applied to coordinates given the change in position of the object to refine the positions.

Two distance thresholds, $D_A$ and $D_B$, as shown in FIG. 10, define three ranges of motion. A change in position that is less than $D_A$, motion is heavily dampened 1001 by $S_A$, thereby reducing the tendency of a value to switch back and forth between two nearby values (a side effect of the discrete sampling of the images). A change in position greater than $D_B$ is lightly dampened 1002 by $S_B$, or not dampened. This reduces or eliminates lag and vagueness that is introduced in some other smoothing procedures. The degree of dampening is varied for motion between $D_A$ and $D_B$, the region marked as 1003, so that the transition between light and heavy dampening is less noticeable. The scalar a, which is applied to Eq. 1, is found by Eq. 9 as follows:

$$a = \frac{e(1-S)}{S}$$

In Eq. 9, scalar (a) is bound such that equal to or greater than zero, and less than or equal to one, the dampening value of S is found by Eq. 8, and e is the elapsed time since the previous frame.

These coordinates 314 of the object of interest 105, if found, are typically conveyed to another process such as a user application program 316 for use. They may be conveyed to another process executing on the same image processor 106 as the above calculations where performed, or to another computing device. The method in which the data are conveyed to the application program 316 may include emulation of a traditional user input device (including mouse and keyboard), allowing the system to provide control of existing control functions within the application program 316. The coordinates 314 of the object of interest 105 may be calculated for every video frame captured by the cameras, where one video frame is typically captured 30 times or more every second. This results in little latency between the user's actions and the application's reactions.

In a typical implementation of the system, the application program 316 provides user feedback by displaying to the video display 107 a visual representation of an indicator. The indicator is caused to move such that its position and motion mimics the motion of the object of interest 105 (typically the user's hand).

In one variation of this form of user interface, the indicator, such as a mouse pointer, is shown in front of other graphics, and its movements are mapped to the two dimensional space defined by the surface of the screen. This form of control is analogous to that provided by a computer mouse, such as that used with the Microsoft® Windows® operating system. An example feedback image of an application that uses this style of control is shown as 1102 in FIG. 11A.

Figure 11A:
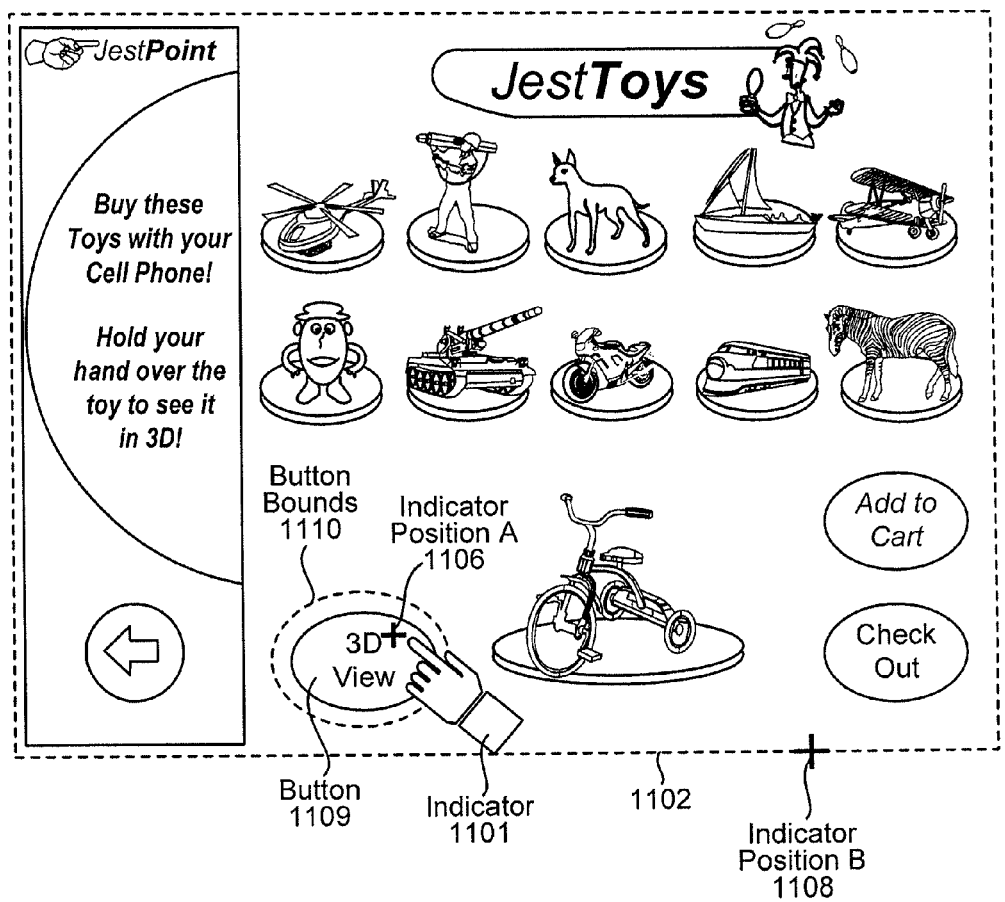
FIG. 11A is an example of an application program that is controlled by the system, where the object of interest controls a screen pointer in two dimensions.

Referring to FIG. 11A (and briefly to FIG. 3), the image processor 106 also includes an optional coordinate re-mapping process 317 (FIG. 3). The coordinate re-mapping process 317 is operable to remap the global presence and position coordinates 314 (associated with the object of interest 105) into the position where the indicator 1101 (such as a cursor or mouse pointer) is overlaid onto the image 1102 by way of Eq. 10 for the x coordinate, and the equivalent of this equation for the y coordinate, as follows:

$$x_c = \begin{cases} 0 & \text{if } x_h < b_l \\ \frac{x_h - b_l}{b_r - b_l} & \text{if } b_l \le x_h \le b_r \\ 1 & \text{if } x_h > b_r \end{cases}$$

Figure 11B:
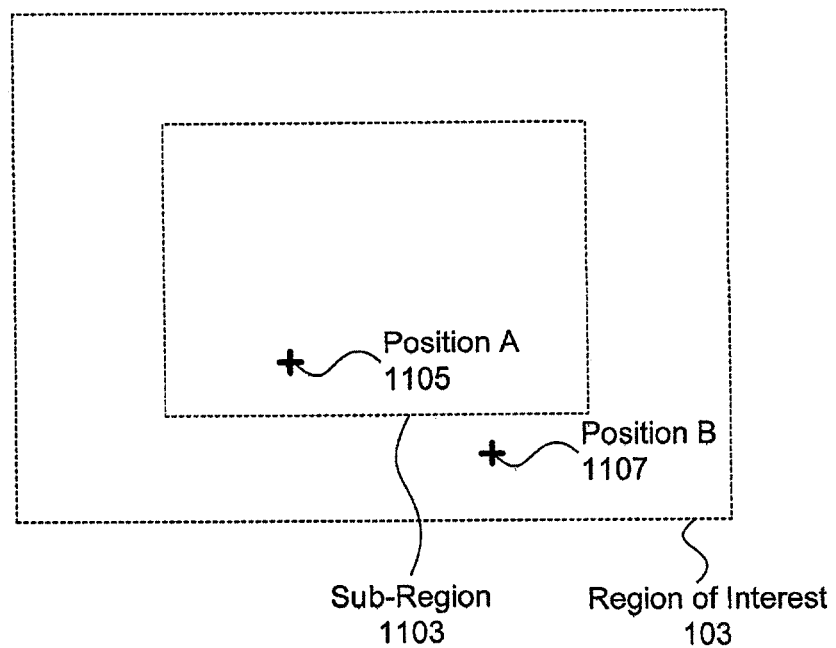
FIG. 11B shows the mapping between real-world coordinates and screen coordinates used by the application program in FIG. 11A.

In Eq. 10, $x_h$ is the coordinate position 314 associated with the object 105, $x_c$ is the cursor position on the screen, mapped 0-1, and $b_l$ and $b_r$ are the positions of the left and right bounds of a sub-region within the region of interest 103. As illustrated in FIG. 11B, the entire region of the display 1102 is represented by a sub-region 1103 contained entirely within the region of interest 103. Positions (for example, position A 1105) within the sub-region 1103 are linearly mapped to positions (for example, 1106) within the display 1102. Positions (for example, position B 1107) outside the sub-region 1103 but still within the region of interest 103 are mapped to the nearest position (for example, 1108) on the border of the display region 1102. This reduces the likelihood of the user unintentionally removing the object of interest 105 (usually the user's hand or pointing finger) from the sub-region while attempting to move the indicator 1101 to a position near a border of the display.

In scenarios where the region of interest 103 is immediately in front of the video display 107, the sub-region 1103 may be defined to be aligned to the video display 107, so that the indicator 1101 will appear to be aligned with the object of interest 105. If the region of interest 103 is relatively thin, for example less that 5 cm, and the sub-region 1103 is defined in this way, then the system approximates, in terms of user-interaction, a "touch-screen" without limitations on the size of the video display 107, and without requiring direct contact between the user and video display's 107 surface (for example, the video display and user may be on opposite sides of a window). As will be appreciated, the system 100 can be used with a variety of video display sizes, and may include not only computer monitors (whether CRT or LCD type displays), but also may include rear projection style television monitors, large flat screen LCD monitors, and forward projection style presentation systems.

In scenarios where the region of interest 103 is not immediately in front of a large video display 107, and the active image region 208 is sufficiently deep that the orientation of the object of interest is found in the orientation calculation process 609, a vector may be extended from the object of interest's position to the video display 107 using the angle of orientation to detect the position on the video display that the user is "pointing to."

Most often, however, the active image region 208 is not sufficiently deep to accurately calculate the orientation in process block 609. In these scenarios, where the region of interest 103 is not immediately in front of a large video display 107 and the orientation is not calculated, Eq. 10 may be applied where the sub-region 1103 is smaller than the video display. The processor then maps the absolute position of the object of interest 105 to the position indicator such that movements of the object of interest 105 are scaled to larger movements of the location of the position indicator on the video display, which allows the entire area of the video display to be easily reached by the user (for example the sub region 1103 may be defined to be at most 750 mm in width and proportional in height, a size that is easily reached by most users). When setup in this way, the system still provides the user the feeling of "pointing to the screen."

Figure 12A:
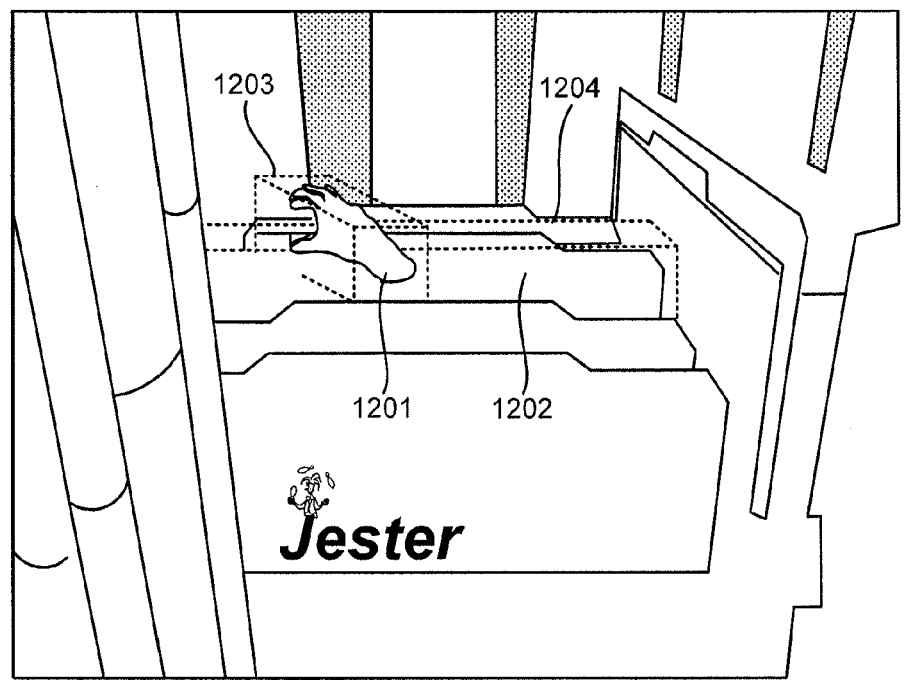
FIGS. 12A and 12B are examples of an application program that is controlled by the multicamera control system, where the object of interest controls a screen pointer in a three dimensional virtual reality environment.
Figure 12B:
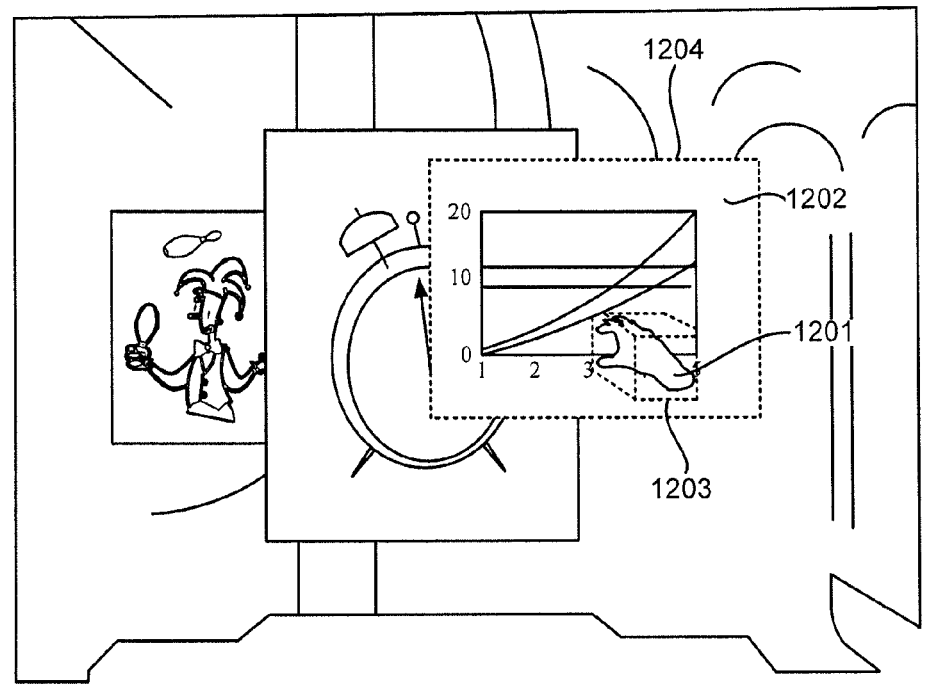

In another variation of this form of user interface, the user causes a representation of an indicator to move within a representation of a three dimensional virtual environment (examples are presented in FIG. 12A and FIG. 12B). The virtual environment may be rendered using projective transforms, so that the depths of the virtual environment are implied by the image presented on the video display 107. Techniques for rending this sort of virtual environment include OpenGL. Eq. 10 is used to remap the x, y, and z coordinates (the sub-region 1103 becomes, for example, a cube).

Applications that are controlled by a movable on screen indicator (for example, FIGS. 11A, 12A, and 12B), whose control has been discussed, typically present graphic representations of data or interactive elements (for example, a button 1109 or an object representation 1202). The user is expected to cause the indicator 1101 to be positioned over one of these objects, or if a three-dimensional virtual environment is presented, touches or interacts with the object. For a two-dimensional interface, this condition may be detected by comparing the remapped indicator position 1106 to the bounds (for example, 1110) of the graphic representation of the object, where this condition is true if the indicator position is within the object bounds. For the three-dimensional interface, this condition may be detected by comparing the bounds 1203 of either the entire indicator 1101, or if finer control is required, a part of the indicator, with the bounds 1204 of the object 1202. The user optionally receives feedback indicating that the cursor is positioned over an object. Feedback may be of a variety of forms, including an audio cue and/or a change in the graphical representation of either or both the cursor and object. The user may then activate, manipulate, or move the object that is under the cursor. The user is expected to indicate his intention to activate, manipulate, or move the object by performing a gesture.

The motion of the object of interest 105 may optionally be interpreted and classified by the gesture detection module 315 as described above with respect to FIG. 3. The gesture detection process 315 may utilize the data produced from any component of the system. The final coordinates 314, image coordinates 310 and 311, or a combination of 310, 311, and 314, may be sampled over time and provided as input to the gesture detection process 315. A variety of gestures (for example, "hovering" and "poking") have been successfully detected using this data as input to a gesture detection process 315.

In scenarios where the application's state (that is, whether or not the indicator 1101 is over a button 1109) is known and is conveyed to the gesture detection module 315. One gesture that the user performs to indicate the intention to activate the object (for example screen objects 1109, 1202) that is under the cursor 1101 is to cause the cursor to hover over the object (examples 1109, 1202) for longer than a predefined duration. This gesture performed by the user is detected by monitoring the application's state and triggering the gesture when the application state remains unchanged for the predetermined duration. The application need not be created specifically for the multicamera control system 100, as techniques exist that can unobtrusively monitor an application's state (in the Windows operating system by setting a "hook" using the Windows SDK function "SetWindowsHookEx") and emulating a mouse "click" (in the Windows operating system by using the Windows SDK function "SendInput").

In some scenarios, the application state may not be available and may not be monitored. In this case, some exemplary gestures that indicate the intention to active the object (for example screen objects 1109, 1202) under the cursor 1101 are holding the hand stationary ("hovering"), or poking the hand quickly forward and back.

A method by which "hovering" has been detected is by keeping a history of the position of the object of interest 105, where that history contains all records of the position and state for a predefined duration of time, ending with the most recent sample. That duration represents the minimum duration that the user must hold the hand stationary. The minimum and maximum position, separately in each of the three (x,y,z) dimensions, is found within the history. If the object of interest 105 was present within the region of interest 103 in all samples of the history, and the distance between the minimum and maximum is within a predefined threshold for each of the three dimensions, then the "hovering" gesture is reported. Those distance thresholds represent the maximum amount that the object of interest 105 is allowed to move, plus the maximum amount of variation (or "jitter") expected to be introduced into the hand position by the various components of the system. The typical method in which this gesture is reported, where the system is emulating a mouse as described above, is to emulate a mouse "click." Gestures representing additional operations of the mouse, "double clicks" and "dragging," have also been detected and those operations have been emulated.

In addition, gestures that are independent of the position of the indicator relative to an object may optionally be detected and given meaning by the application that may or may not be dependent on the application's state. An application that uses this style of interaction typically does not explicitly use or display the object of interest's position 317 or other positions. These applications can be wholly or primarily controlled with only the interpretations of the positions made by this system. These applications also need not be created specifically for this system because the interpretations made by this system can be used to simulate an action that would be performed on a traditional user input device, such as a keyboard or joystick.

Many useful interpretations depend directly on the absolute position of the object of interest 105 within the region of interest 103. (Alternately, the indicator position 1105 within the sub-region 1103 may be used in an equivalent manner). One method of making these interpretations is to define boxes, planes, or other shapes. A state is triggered on if the position (for example the position defined by block 314, or alternately by the remapped coordinates from remapping process 317) of the object of interest 105 is found to be within a first box (or beyond the border defined by the first plane), and had not been in the immediately preceding observation (either because it was elsewhere within the region of interest 103, or was not detected). This state is maintained until the hand position is not found to be within a second box (or beyond the border defined by the second plane), at which time the state is triggered off. The second box must contain the entire first box, and is typically larger. The use of a larger box reduces occurrences of the state unintentionally triggering on and off when the object of interest 105 is detected to be near the border of the boxes, where a very small motion or minor noise in the image signals would otherwise cause the position 317 to otherwise drift in and out of the box. Typically one of three methods of interpreting this state is used, depending on the intended use of the gesture. In one method, the gesture directly reflects the state with an on and off trigger. When emulating a keyboard key or joystick fire button, it is "pressed" when the state is triggered on, and "released" when the state is triggered off. In another method, the gesture is only triggered by the transition of the state from off to on. When emulating a keyboard key or joystick button, the key is "clicked." Although the duration and off state are not reported to the application, they are maintained so that the gesture will not be repeated until after the state is triggered off, so that each instance of the gesture requires a clearly defined intent by the user. A third method is to trigger the gesture when by the transition of the state from off to on, and to periodically re-trigger the gesture at predefined intervals so long as the state remains on. This emulates that way in which, holding a key down on a keyboard, causes the character to repeat in some applications.

Figure 13A:
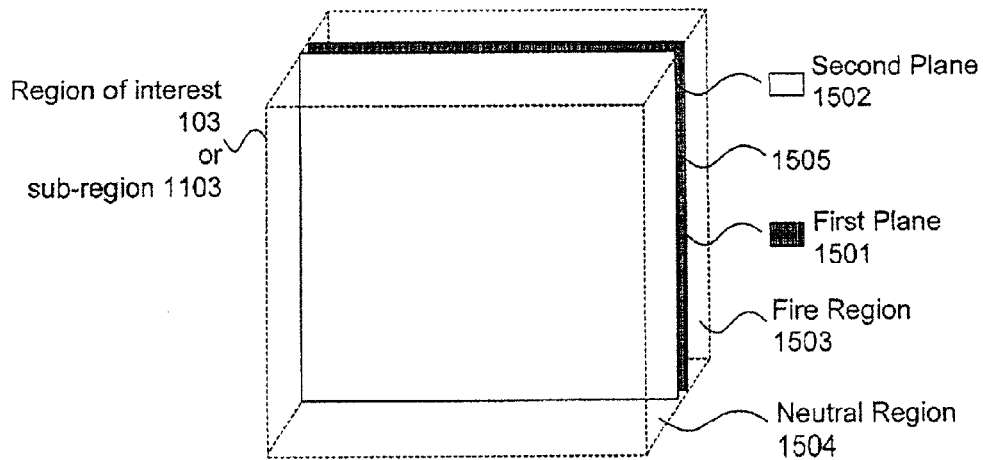
FIG. 13A shows the division of the region of interest into detection planes used by a gesture detection method to identify a gesture that may be associated with the intention to activate.

One way in which boxes or planes, for the above techniques, may be defined within the region of interest 103 is as follows. By defining a first plane (1501 in FIG. 13A) and second plane 1502 that divides the region of interest into "fire" 1503 and "neutral" 1504 regions (the gesture reported when the object of interest 105 is in the region 1505 between the planes depends on the previous positions of the object, as described above), the above technique can detect the object of interest 105 (typically a hand) "pushing" forward, which is one gesture for emulating a fire button on a joystick, or causing the application to respond in a way that is commonly associated with the pressing of a joystick button (for example, the firing of a weapon in a video game).

Figure 13B:
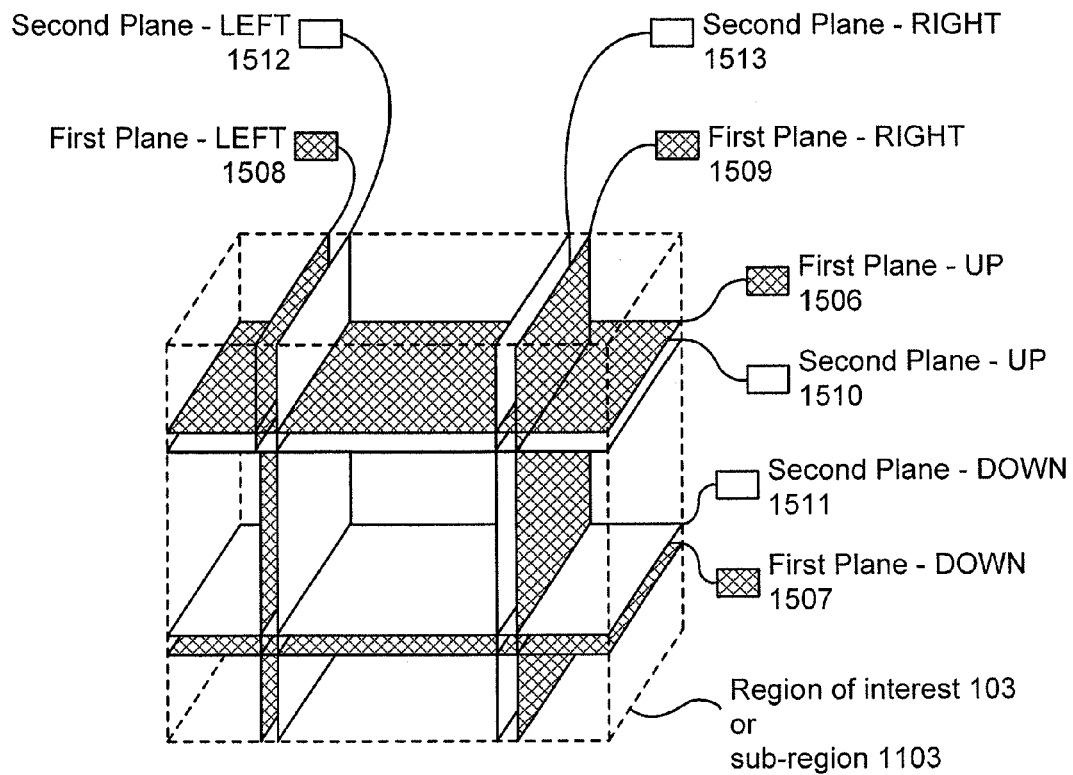
FIG. 13B shows the division of the region of interest into detection boxes used by a gesture detection method to identify a gesture that may be associated with selecting a cursor direction.

Another technique in which boxes or planes, for the above techniques, may be defined within the region of interest 103 is as follows. Planes of the first type 1506, 1507, 1508, 1509 are defined that separate each of the left, right, top and bottom portions of the region of interest 103, overlapping in the corner regions as illustrated in FIG. 13B. Planes of the second type are labeled as 1510, 1511, 1512, 1513. Each pair of first and second planes is processed independently. This combination of planes emulates the four directional cursor keys, where a hand in a corner triggers two keys, commonly interpreted by many applications as the four secondary 45 degree (diagonal) directions. Emulating the keyboard cursor in this method allows a variety of existing applications to be controlled by system 100, including, for example, Microsoft® PowerPoint® which responds to the emulated cursor keys (e.g. the up and down arrow keys) by advancing to the next or previous slide in a presentation sequence.

Figure 13C:
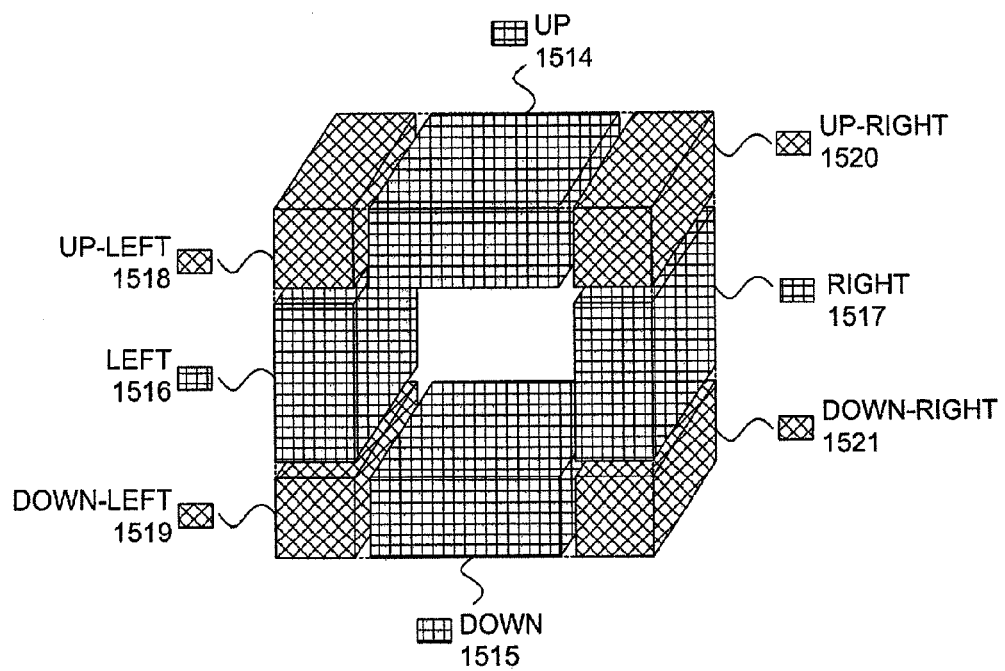
FIG. 13C shows an alternate division of the region of interest into direction detection boxes used by a gesture detection method to identify a gesture that may be associated with selecting a cursor direction.
Figure 13D:
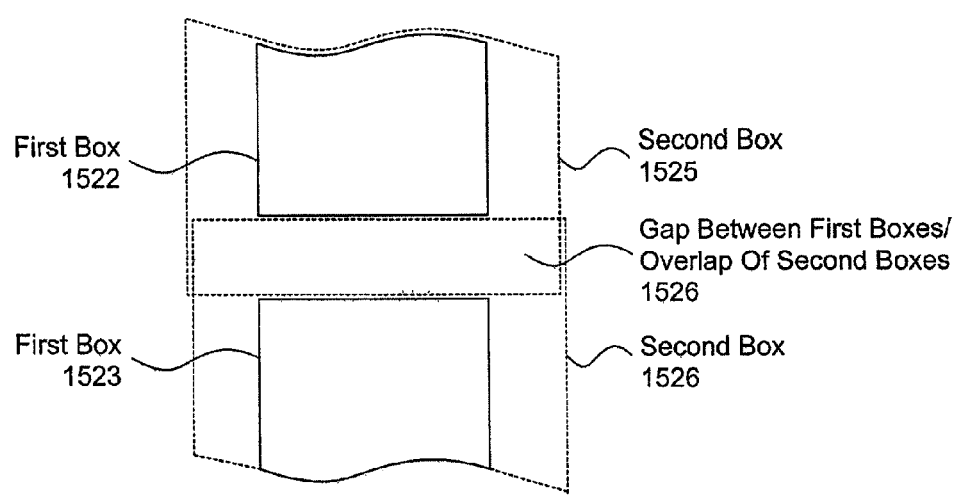
FIG. 13D illustrates in greater detail the relationship of neighboring divisions of FIG. 13C.

Another method of emulating control of discreet directions applies for applications that expect the four 45 degree direction states to be explicitly represented. Boxes 1514, 1515, 1516, 1517 are defined for each of the four primary (horizontal and vertical) directions, with additional boxes 1518, 1519, 1520, 1521 defined for each of the secondary 45 degree (diagonal) directions as illustrated FIG. 13C. For clarity, only boxes of the first type are illustrated. A gap is placed between these boxes. FIG. 13D illustrates how neighboring boxes are defined. The gap between boxes of the first type 1522, 1523 assures that the user intentionally causes the object of interest 105 to enter the box, while the gap 1524 is filled by overlapping boxes of the second type 1525, 1526, so that the system will report the previous gesture until the user was clearly intended to move the object of interest 105 into either a neighboring box or the central neutral region. This combination of buttons can be used to emulate an eight-directional joystick pad.

A wider class of gestures depend on motion instead of or in addition to position. An example is the gesture of "swiping the hand to the left." This is a one gesture to convey to an application that it is to return to a previous page or state. Through emulation of a keyboard and mouse, this gesture may be used to control information presentation software, in particular Microsoft® PowerPoint®, to go to the previous slide of a presentation sequence. Through emulation of a keyboard and mouse, this gesture causes a web browser to perform the action associated with its "back" button. Similarly, the gesture of "swiping the hand to the right" is one gesture to convey to an application that the user desires to go to the next page or state. For example, this gesture causes presentation software to go to the next slide of a presentation sequence, and causes browser software to go to the next page.

One method for detecting "swiping the hand to the left" is as follows. A thin stripe along the leftmost part of the region of interest 103 is defined as the left-edge region. The position (for example the position defined by block 314, or alternately by the remapped coordinates from remapping process 317) of the object of interest 105 is represented as the following three states:

1. Object of interest is present and not inside the left-edge region
2. Object of interest is present and inside the left-edge region
3. Object of interest is not present within the hand detection region.

A transition from state 1 to state 2 above causes the gesture detection module 315 to enter a state whereby it starts a timer and waits for the next transition. If a transition to state 3 is observed within a predetermined duration of time, the "swiping the hand off to the left" gesture is reported to have occurred. This technique is typically duplicated for the right, upper, and lower edges, and, because the hand position is found in three dimensions, also duplicated to detect "pulling the hand back."

A variety of gesture detection techniques have been discussed. Still other gesture detection techniques (for example, Hidden Markov Layers) are described in research literature, and may be applied in the various implementations of the system 100 described herein.

Referring back to FIGS. 1 and 3, another implementation of the multicamera control system 100 is described in further detail. While FIG. 1 shows a two camera system, it should be understood that the image processor 106 can be configured to receive input from more than two cameras, and may for particular applications include four (4) or more video cameras. In the four camera implementation, components 304-311 of FIG. 3 are duplicated to support the two additional cameras. Additionally, the combination module 312 is configured to receive four sets of camera-relative presence and position data (similar to data 310 and 311) associated with the object of interest 105 being tracked. The techniques and equations (in particular, Eq. 5 and Eq. 6) previously described can be applied to the additional pair(s) of cameras, where the output of the combination module 312 is the average of all the position from each of the camera pairs. The gesture detection module 315 is similarly reconfigured to receive four sets of cameral-relative presence and position data 310, 311 from the two additional detection modules (similar to 308, 309) which are substantially similar to detection modules 310 and 311.

The output from the image processor 106, which now includes processed object position coordinates and gesture information associated with four cameras, can be used by another process or user application program 316. The formulas and geometry (described above) used to calculate coordinate information associated with the object of interest 105 from the two additional cameras are also used.

In one implementation using four cameras, the two additional cameras are positioned at the bottom two corners within the controlled background 104 and are oriented such that to the region of interest 103 is within the field of view 205 of each camera. The advantage of a four camera system is that the position of the object of interest 105 can be tracked with greater accuracy. Thus, the application program may include more screen objects with increased density on the video display 107 because the increased tracking accuracy allows objects that are close in proximity to be correctly selected by small movements with the object of interest 105. Moreover, the two additional cameras reduce errors in tracking the object of interest 105 when a portion of the object of interest 105 is occluded within the field of view 205 associated with one or more of the other cameras.

While a number of implementations have been described, it will be understood that various modifications may be made. Accordingly, other implementations are within the scope of the following claims.

What is claimed is:

1. A method comprising:
   accessing a first image and a second image of at least a portion of a scene;
   analyzing, by a processor, the first image and the second image to detect an object of interest in at least one of the first image and the second image;
   generating a history of the object of interest;
   detecting an occurrence of a gesture made by the object of interest by analyzing the history; and
   providing an output based on the detected occurrence of the gesture.

2. The method of claim 1, further comprising:
   determining coordinates representing a location of the detected object of interest, wherein:
   the coordinates representing the location of the detected object of interest are used in generating the history of the object of interest.

3. The method of claim 1, wherein analyzing the first image and the second image to detect the object of interest comprises:

generating a background model, wherein the background model comprises a luminance value for each pixel in a region of interest and the object of interest is detected within the region of interest.

4. The method of claim 3, wherein analyzing the first image and the second image to detect the object of interest further comprises:
creating a difference map, wherein the difference map comprises positions of pixels, from at least one of the first image and the second image, having a luminance inconsistent with the background model.

5. The method of claim 4, wherein analyzing the first image and the second image to detect the object of interest further comprises:
performing a cluster identification process on the difference map to detect the object of interest.

6. The method of claim 3, wherein the region of interest is substantially planar.

7. The method of claim 1, wherein providing the output based on the detected occurrence of the gesture comprises controlling an application based on the detected occurrence of the gesture.

8. The method of claim 1, wherein the gesture comprises a poking gesture.

9. The method of claim 1, wherein the object of interest comprises a human hand.

10. A system, comprising:
one or more processors; and
a memory communicatively coupled with and readable by the one or more processors and having stored therein processor-readable instructions which, when executed by the one or more processors, cause the one or more processors to:
access a first image and a second image of at least a portion of a scene;
analyze the first image and the second image to detect an object of interest in at least one of the first image and the second image;
generate a history of the object of interest;
detect an occurrence of a gesture made by the object of interest by analyzing the history; and
provide an output based on the detected occurrence of the gesture.

11. The system of claim 10, wherein the processor-readable instructions further comprise processor-readable instructions which, when executed by the one or more processors, cause the one or more processors to:
determine coordinates representing a location of the detected object of interest, wherein:
the coordinates representing the location of the detected object of interest are used in generating the history of the object of interest.

12. The system of claim 10, wherein the processor-readable instructions that cause the one or more processors to analyze the first image and the second image to detect the object of interest further comprise processor-readable instructions which, when executed by the one or more processors, cause the one or more processors to:
generate a background model, wherein the background model comprises a luminance value for each pixel in a region of interest and the object of interest is detected within the region of interest.

13. The system of claim 12, wherein the processor-readable instructions that cause the one or more processors to analyze the first image and the second image to detect the object of interest further comprise processor-readable instructions which, when executed by the one or more processors, cause the one or more processors to:
create a difference map, wherein the difference map comprises positions of pixels, from at least one of the first image and the second image, having a luminance inconsistent with the background model.

14. The system of claim 13, wherein the processor-readable instructions that cause the one or more processors to analyze the first image and the second image to detect the object of interest further comprise processor-readable instructions which, when executed by the one or more processors, cause the one or more processors to:
perform a cluster identification process on the difference map to detect the object of interest.

15. The system of claim 12, wherein the region of interest is substantially planar.

16. The system of claim 10, wherein the processor-readable instructions that cause the one or more processors to provide the output based on the detected occurrence of the gesture further comprises processor-readable instructions configured to cause the one or more processors to control an application based on the detected occurrence of the gesture.

17. The system of claim 10, wherein the gesture comprises a poking gesture.

18. The system of claim 10, wherein the object of interest comprises a human hand.

19. An apparatus, the apparatus comprising:
means for accessing a first image and a second image of at least a portion of a scene;
means for analyzing the first image and the second image to detect an object of interest in at least one of the first image and the second image;
means for generating a history of the object of interest;
means for detecting an occurrence of a gesture made by the object of interest by analyzing the history; and
means for providing an output based on the detected occurrence of the gesture.

20. The apparatus of claim 19, further comprising:
means for determining coordinates representing a location of the detected object of interest, wherein:
the coordinates representing the location of the detected object of interest are used in generating the history of the object of interest.

21. The apparatus of claim 19, wherein the means for analyzing the first image and the second image to detect the object of interest comprises:
means for generating a background model, wherein the background model comprises a luminance value for each pixel in a region of interest and the object of interest is detected within the region of interest.

22. The apparatus of claim 21, wherein the means for analyzing the first image and the second image to detect the object of interest further comprises:
means for creating a difference map, wherein the difference map comprises positions of pixels, from at least one of the first image and the second image, having a luminance inconsistent with the background model.

23. The apparatus of claim 22, wherein the means for analyzing the first image and the second image to detect the object of interest further comprises:
means for performing a cluster identification process on the difference map to detect the object of interest.

24. A computer program product residing on a non-transitory processor-readable medium, the computer program product comprising processor-readable instructions configured to cause one or more processors to:

access a first image and a second image of at least a portion of a scene;
analyze the first image and the second image to detect an object of interest in at least one of the first image and the second image;
generate a history of the object of interest;
detect an occurrence of a gesture made by the object of interest by analyzing the history; and
provide an output based on the detected occurrence of the gesture.

* * * * *